US009344850B2

(12) United States Patent
Sheha et al.

(10) Patent No.: US 9,344,850 B2
(45) Date of Patent: May 17, 2016

(54) METHOD AND SYSTEM FOR COLLECTING, SYNCHRONIZING, AND REPORTING TELECOMMUNICATION CALL EVENTS

(75) Inventors: Michael A. Sheha, Laguna Niguel, CA (US); Angie Sheha, Laguna Niguel, CA (US); Stephen G. Petilli, Laguna Niguel, CA (US); Dima Dorfman, Irvine, CA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 10/914,933

(22) Filed: Aug. 9, 2004

(65) Prior Publication Data
US 2005/0032527 A1     Feb. 10, 2005

Related U.S. Application Data

(60) Provisional application No. 60/493,704, filed on Aug. 8, 2003.

(51) Int. Cl.
*H04W 4/02*      (2009.01)
*H04M 1/2745*    (2006.01)
(Continued)

(52) U.S. Cl.
CPC ........ *H04W 4/027* (2013.01); *H04M 1/274583* (2013.01); *H04M 1/56* (2013.01);
(Continued)

(58) Field of Classification Search
CPC ............... H04M 2207/18; H04M 2250/10; H04M 3/42; H04M 3/42042; H04M 3/42348; H04M 15/31; H04M 15/41; H04M 1/27; H04M 1/575; H04M 1/72572; H04M 2215/0164; H04M 2215/32; H04M 2215/96; H04M 3/2218; H04M 3/42093; H04W 4/02; H04W 24/00; H04W 64/006
USPC ............................ 455/41.1–41.3, 456.1–457
See application file for complete search history.

(56) References Cited

U.S. PATENT DOCUMENTS 4,737,916 A    4/1988  Ogawa
4,939,662 A    7/1990  Numura
(Continued)

FOREIGN PATENT DOCUMENTS

GB      2 359 888 A       9/2001
WO      WO-96/36930       11/1996
(Continued)

OTHER PUBLICATIONS

International Search Report mailed Apr. 17, 2006, for PCT Application No. PCT/US2004/025845, filed Aug. 9, 2004, one page.
(Continued)

*Primary Examiner* — Matthew Sams
(74) *Attorney, Agent, or Firm* — Tarolli, Sundheim, Covell & Tummino LLP

(57) ABSTRACT

The present invention is directed to a method and apparatus for recording and generating additional information related to telecommunication events using a mobile communication device, such as a telephone call or a text messaging event using cellular phone or a personal digital assistant. Specifically, the preferred embodiments of the present invention record information such as GPS coordinates that indicate a position of the mobile communication device during the communication event, as well as a location of a sender or receiver of data to or from the mobile communication device, so as to facilitate a log entry of the position of the mobile communication device as well as other useful information that are associated with the communication events.

13 Claims, 33 Drawing Sheets

(51) Int. Cl.
*H04M 1/56* (2006.01)
*H04M 1/57* (2006.01)
*H04M 3/42* (2006.01)
*H04M 15/00* (2006.01)
*H04W 4/24* (2009.01)
*H04M 1/725* (2006.01)
*H04W 4/20* (2009.01)
*H04W 8/14* (2009.01)
*H04W 8/16* (2009.01)
*H04W 88/02* (2009.01)

(52) U.S. Cl.
CPC ............... *H04M 1/575* (2013.01); *H04M 3/42* (2013.01); *H04M 15/44* (2013.01); *H04M 15/58* (2013.01); *H04W 4/24* (2013.01); *H04M 1/72566* (2013.01); *H04M 1/72572* (2013.01); *H04M 2215/0104* (2013.01); *H04M 2215/0188* (2013.01); *H04M 2215/2026* (2013.01); *H04M 2215/32* (2013.01); *H04M 2250/10* (2013.01); *H04M 2250/60* (2013.01); *H04W 4/02* (2013.01); *H04W 4/20* (2013.01); *H04W 8/14* (2013.01); *H04W 8/16* (2013.01); *H04W 88/02* (2013.01)

(56) References Cited

U.S. PATENT DOCUMENTS

| | | | |
|---|---|---|---|
| 5,389,934 A | 2/1995 | Kass | |
| 5,557,254 A | 9/1996 | Johnson | |
| 5,636,122 A * | 6/1997 | Shah et al. | 701/207 |
| 5,684,951 A | 11/1997 | Goldman | |
| 5,689,269 A | 11/1997 | Norris | |
| 5,689,809 A | 11/1997 | Grube | |
| 5,727,057 A * | 3/1998 | Emery et al. | 379/201.07 |
| 5,774,824 A | 6/1998 | Streit | |
| 5,801,700 A | 9/1998 | Ferguson | |
| 5,802,492 A | 9/1998 | DeLorme | |
| 5,806,005 A * | 9/1998 | Hull et al. | 455/566 |
| 5,904,727 A * | 5/1999 | Prabhakaran | 701/208 |
| 5,926,118 A | 7/1999 | Hayashida | |
| 5,944,768 A | 8/1999 | Ito | |
| 5,982,301 A | 11/1999 | Ohta | |
| 6,035,253 A | 3/2000 | Hayashi | |
| 6,049,718 A | 4/2000 | Stewart | |
| 6,064,880 A | 5/2000 | Alanara | |
| 6,084,951 A | 7/2000 | Smith | |
| 6,091,957 A * | 7/2000 | Larkins et al. | 455/456.2 |
| 6,138,003 A | 10/2000 | Kingdon | |
| 6,169,516 B1 | 1/2001 | Watanabe | |
| 6,182,006 B1 | 1/2001 | Meek | |
| 6,182,227 B1 | 1/2001 | Blair | |
| 6,185,426 B1 * | 2/2001 | Alperovich et al. | 455/456.1 |
| 6,188,957 B1 | 2/2001 | Bechtolsheim | |
| 6,204,844 B1 | 3/2001 | Fumarolo | |
| 6,208,934 B1 | 3/2001 | Bechtolsheim et al. | |
| 6,226,367 B1 | 5/2001 | Smith | |
| 6,249,742 B1 | 6/2001 | Frriederich | |
| 6,278,936 B1 | 8/2001 | Jones | |
| 6,314,296 B1 * | 11/2001 | Hamada et al. | 455/456.2 |
| 6,317,684 B1 | 11/2001 | Roeseler | |
| 6,321,158 B1 | 11/2001 | DeLorme | |
| 6,331,825 B1 | 12/2001 | Ladner | |
| 6,353,664 B1 | 3/2002 | Cannon | |
| 6,360,102 B1 | 3/2002 | Havinis et al. | |
| 6,366,782 B1 | 4/2002 | Fumarolo | |
| 6,366,856 B1 | 4/2002 | Johnson | |
| 6,377,210 B1 * | 4/2002 | Moore | 342/357.13 |
| 6,397,143 B1 | 5/2002 | Paschke | |
| 6,415,224 B1 * | 7/2002 | Wako et al. | 701/208 |
| 6,441,752 B1 | 8/2002 | Fomukong | |
| 6,442,384 B1 | 8/2002 | Shah | |
| 6,442,391 B1 | 8/2002 | Johansson | |
| 6,459,782 B1 | 10/2002 | Bedrosian | |
| 6,466,788 B1 | 10/2002 | Carlsson | |
| 6,526,351 B2 * | 2/2003 | Whitham | 701/211 |
| 6,529,143 B2 * | 3/2003 | Mikkola et al. | 340/995.1 |
| 6,539,080 B1 | 3/2003 | Bruce | |
| 6,563,824 B1 | 5/2003 | Bhatia | |
| 6,571,174 B2 | 5/2003 | Rigazio | |
| 6,621,423 B1 | 9/2003 | Cooper | |
| 6,640,185 B2 | 10/2003 | Tokota | |
| 6,643,516 B1 * | 11/2003 | Stewart | 455/456.6 |
| 6,661,353 B1 | 12/2003 | Gopen | |
| 6,665,613 B2 | 12/2003 | Duvall | |
| 6,665,715 B1 * | 12/2003 | Houri | 709/223 |
| 6,674,849 B1 | 1/2004 | Froeberg | |
| 6,721,652 B1 | 4/2004 | Sanqunetti | |
| 6,721,716 B1 | 4/2004 | Gross | |
| 6,721,787 B1 * | 4/2004 | Hiscock | 709/217 |
| 6,741,864 B2 * | 5/2004 | Wilcock et al. | 455/456.1 |
| 6,766,174 B1 * | 7/2004 | Kenyon | 455/457 |
| 6,775,371 B2 | 8/2004 | Elsey | |
| 6,801,850 B1 | 10/2004 | Wolfson | |
| 6,810,405 B1 * | 10/2004 | LaRue et al. | 707/613 |
| 6,816,782 B1 | 11/2004 | Walters | |
| 6,819,268 B2 * | 11/2004 | Wakamatsu et al. | 340/988 |
| 6,819,919 B1 | 11/2004 | Tanaka | |
| 6,829,532 B2 * | 12/2004 | Obradovich et al. | 701/207 |
| 6,839,630 B2 | 1/2005 | Sakamoto | |
| 6,842,696 B2 | 1/2005 | Silvester | |
| 6,845,321 B1 | 1/2005 | Kerns | |
| 6,885,874 B2 | 4/2005 | Grube | |
| 6,895,329 B1 | 5/2005 | Wolfson | |
| 6,898,516 B2 | 5/2005 | Pechatnikov | |
| 6,910,818 B2 | 6/2005 | McLoone | |
| 6,925,603 B1 | 8/2005 | Naito | |
| 6,934,705 B2 | 8/2005 | Tu | |
| 6,938,100 B2 * | 8/2005 | Kang | 709/248 |
| 6,944,535 B2 | 9/2005 | Iwata | |
| 6,970,871 B1 | 11/2005 | Rayburn | |
| 7,054,615 B2 * | 5/2006 | Evensen et al. | 455/411 |
| 7,058,506 B2 | 6/2006 | Kawase | |
| 7,089,110 B2 | 8/2006 | Pechatnikov | |
| 7,142,196 B1 | 11/2006 | Connor | |
| 7,142,205 B2 | 11/2006 | Chithambaram | |
| 7,167,187 B2 | 1/2007 | Scott | |
| 7,171,304 B2 | 1/2007 | Wako | |
| 7,202,801 B2 | 4/2007 | Chou | |
| 7,266,376 B2 * | 9/2007 | Nakagawa | 455/456.1 |
| 7,286,929 B2 | 10/2007 | Staton | |
| 7,333,820 B2 * | 2/2008 | Sheha et al. | 455/457 |
| 7,565,157 B1 | 7/2009 | Ortega | |
| 7,653,544 B2 | 1/2010 | Bradley | |
| 7,715,351 B2 * | 5/2010 | Karaoguz et al. | 370/338 |
| 7,739,033 B2 | 6/2010 | Murata | |
| 7,751,614 B2 | 7/2010 | Funakura | |
| 7,774,003 B1 | 8/2010 | Ortega | |
| 7,786,876 B2 | 8/2010 | Troxler | |
| 7,822,823 B2 | 10/2010 | Jhanji | |
| 7,881,730 B2 | 2/2011 | Sheha | |
| 8,112,529 B2 | 2/2012 | Van den Oord | |
| 8,185,128 B2 * | 5/2012 | Lamba et al. | 455/456.1 |
| 8,264,570 B2 | 9/2012 | Karimoto | |
| 8,285,245 B2 | 10/2012 | Ashley | |
| 8,301,159 B2 | 10/2012 | Hamynen | |
| 8,331,611 B2 | 12/2012 | Johnson | |
| 8,332,402 B2 | 12/2012 | Forstall | |
| 2001/0015756 A1 | 8/2001 | Wilcock | |
| 2001/0016849 A1 | 8/2001 | Squibbs | |
| 2001/0046884 A1 * | 11/2001 | Yoshioka | 455/564 |
| 2002/0022492 A1 * | 2/2002 | Barak et al. | 455/457 |
| 2002/0032036 A1 | 3/2002 | Nakajima | |
| 2002/0034964 A1 * | 3/2002 | Bannai et al. | 455/556 |
| 2002/0052786 A1 | 5/2002 | Kim et al. | |
| 2002/0059201 A1 | 5/2002 | Work | |
| 2002/0069239 A1 | 6/2002 | Katada | |
| 2002/0085540 A1 * | 7/2002 | Hyvarinen et al. | 370/352 |
| 2002/0086683 A1 | 7/2002 | Kohar | |
| 2002/0099457 A1 * | 7/2002 | Fredlund et al. | 700/91 |
| 2002/0116575 A1 * | 8/2002 | Toyomura et al. | 711/115 |
| 2002/0119786 A1 * | 8/2002 | Boehmke | 455/455 |
| 2002/0123368 A1 * | 9/2002 | Yamadera et al. | 455/556 |

(56) References Cited

U.S. PATENT DOCUMENTS

| | | |
|---|---|---|
| 2002/0130906 A1 | 9/2002 | Miyaki |
| 2002/0169539 A1 | 11/2002 | Menard |
| 2003/0013441 A1* | 1/2003 | Bhogal et al. ............... 455/423 |
| 2003/0013461 A1* | 1/2003 | Mizune et al. ............... 455/456 |
| 2003/0014487 A1 | 1/2003 | Iwakawa |
| 2003/0016804 A1* | 1/2003 | Sheha et al. ............ 379/201.06 |
| 2003/0032448 A1* | 2/2003 | Bulthuis et al. .............. 455/556 |
| 2003/0036848 A1* | 2/2003 | Sheha et al. ................. 701/209 |
| 2003/0036949 A1 | 2/2003 | Kaddeche |
| 2003/0045327 A1* | 3/2003 | Kobayashi et al. .......... 455/557 |
| 2003/0054840 A1 | 3/2003 | Ito |
| 2003/0060938 A1 | 3/2003 | Duvall |
| 2003/0061113 A1 | 3/2003 | Petrovich et al. |
| 2003/0061211 A1 | 3/2003 | Shultz et al. |
| 2003/0073447 A1* | 4/2003 | Ogaki et al. ................. 455/456 |
| 2003/0078054 A1* | 4/2003 | Okuda ......................... 455/456 |
| 2003/0100326 A1* | 5/2003 | Grube et al. ................. 455/515 |
| 2003/0117297 A1* | 6/2003 | Obradovich et al. ........ 340/905 |
| 2003/0119522 A1* | 6/2003 | Barclay et al. ............... 455/456 |
| 2003/0125064 A1* | 7/2003 | Koskinen et al. ............ 455/517 |
| 2003/0126250 A1 | 7/2003 | Jhanji |
| 2003/0134648 A1* | 7/2003 | Reed et al. ................... 455/456 |
| 2003/0149526 A1* | 8/2003 | Zhou et al. ................... 701/213 |
| 2003/0151501 A1 | 8/2003 | Teckchandani |
| 2003/0165254 A1 | 9/2003 | Chen |
| 2003/0231190 A1 | 12/2003 | Jawerth |
| 2003/0236618 A1 | 12/2003 | Kamikawa |
| 2004/0002814 A1 | 1/2004 | Gogic |
| 2004/0008225 A1 | 1/2004 | Cambell |
| 2004/0021567 A1 | 2/2004 | Dunn |
| 2004/0054428 A1 | 3/2004 | Sheha |
| 2004/0124977 A1 | 7/2004 | Biffar |
| 2004/0148378 A1* | 7/2004 | Koide et al. .................. 709/223 |
| 2004/0186880 A1 | 9/2004 | Yamamoto |
| 2004/0203842 A1* | 10/2004 | Hanninen et al. .......... 455/456.1 |
| 2004/0204829 A1 | 10/2004 | Endo |
| 2004/0205517 A1 | 10/2004 | Lampert |
| 2004/0220957 A1 | 11/2004 | McDonough |
| 2004/0229595 A1 | 11/2004 | Laursen |
| 2004/0257273 A1* | 12/2004 | Benco et al. ................. 342/357.1 |
| 2004/0259574 A1* | 12/2004 | Daniels et al. ............. 455/456.3 |
| 2005/0027445 A1 | 2/2005 | McDonough |
| 2005/0062636 A1 | 3/2005 | Conway |
| 2005/0085999 A1 | 4/2005 | Onishi |
| 2005/0125148 A1 | 6/2005 | Van Buer |
| 2005/0159883 A1 | 7/2005 | Humphries |
| 2005/0219067 A1 | 10/2005 | Chung |
| 2005/0242168 A1 | 11/2005 | Tesavis |
| 2006/0019724 A1 | 1/2006 | Bahl |
| 2006/0041375 A1 | 2/2006 | Witmer |
| 2006/0074547 A1 | 4/2006 | Kaufman |
| 2006/0079222 A1* | 4/2006 | Martin .......................... 455/423 |
| 2006/0200359 A1 | 9/2006 | Khan |
| 2006/0268120 A1 | 11/2006 | Funakura |
| 2006/0270421 A1 | 11/2006 | Phillips |
| 2007/0004461 A1 | 1/2007 | Bathina |
| 2007/0032244 A1 | 2/2007 | Counts |
| 2007/0083911 A1 | 4/2007 | Madden |
| 2007/0100981 A1* | 5/2007 | Adamczyk et al. ........... 709/223 |
| 2007/0139411 A1 | 6/2007 | Jawerth |
| 2007/0149213 A1* | 6/2007 | Lamba et al. .............. 455/456.1 |
| 2007/0208687 A1 | 9/2007 | O'Connor |
| 2007/0268392 A1 | 11/2007 | Paalasmaa |
| 2008/0066167 A1 | 3/2008 | Andri |
| 2008/0077324 A1 | 3/2008 | Hatano |
| 2008/0129475 A1 | 6/2008 | Breed |
| 2008/0195314 A1 | 8/2008 | Green |
| 2008/0220747 A1 | 9/2008 | Ashkenazi |
| 2008/0288166 A1 | 11/2008 | Onishi |
| 2009/0113346 A1 | 4/2009 | Wickramasuriya |
| 2009/0177557 A1 | 7/2009 | Klein |
| 2009/0328163 A1 | 12/2009 | Preece |
| 2010/0004993 A1 | 1/2010 | Troy |
| 2010/0042592 A1 | 2/2010 | Stolz |
| 2010/0268848 A1 | 10/2010 | Maurya |
| 2012/0142344 A1* | 6/2012 | Lamba et al. ................. 455/433 |
| 2012/0166074 A1 | 6/2012 | Weng |

FOREIGN PATENT DOCUMENTS

| | | |
|---|---|---|
| WO | WO-2005/015806 A2 | 2/2005 |
| WO | WO-2005/015806 A3 | 2/2005 |

OTHER PUBLICATIONS

Supplemental European Search Report mailed Apr. 3, 2007, for EP Application No. 04780648.4, three pages.

Written Opinion mailed Apr. 17, 2006, for PCT Application No. PCT/US2004/025845, filed Aug. 9, 2004, six pages.

Supplementary European Search Report in European Appl. No. 06839236.4 dated Dec. 6, 2010.

Examiner's Report No. 4 on Australian Patent Appl. No. 2004302220 dated Jul. 26, 2010.

Supplementary European Search Report in European Appl. No. 02 75 0138 dated Oct. 13, 2010.

International Search Report received in PCT/US2011/00917 dated Sep. 1, 2011.

* cited by examiner

AtlasBook™ - Sales Edition
Your Online Address Book with Maps, Directions, and Call Management Setup | Help | Trash Bin | Logout Welcome Angie NIM

| Home | Contacts | Leads | Accounts | Opportunities | Call History | Search | Find on Map | Directions | Reports |

New Contact | New Lead | New Account | New Opportunity | My Incoming Calls | My Outgoing Calls | My Missed Calls Search for:

[Search]

My Recent Contacts
My Recent Places

Last Activity:

- Michael Smith
- Angie Smith
- Steve Smith
- Dima Smith
- Mark Smith
- Acme Manufacturing
- Opportunity One
- Directions: 134 Franklin Terrance, MA 02568
- Map: 18872 Bardeen Ave, Irvine, CA 92612
- Lawrence Design
- Jersey Ware My Contacts: Recently Viewed                                    Thursday - July 10, 2003

View By:
All Contacts | Recently Edited | My Recent Contacts | My Recent Places
Birthdays this Month | New Last Week | New this Week

| Contact Name | Company | Phone |
|---|---|---|
| Michael Smith | Acme Manfaturing | (949) 555-1212 |
| Angie Smith | Lawrence Design | (949) 555-1213 |
| Steve Smith | Jersey Ware | (949) 555-5477 |
| Dima Smith | Platinum Materials | (949) 555-1215 |
| Mark Smith | New Inc. | (949) 555-1216 |
| Anthony Smith | Smith House | (949) 555-5412 |
| Joyce Smith | Networks In Motion, Inc. | (949) 555-1218 |
| Bob Smith | Opp One | (949) 555-1234 |
| Matt Smith | Enterprise | (949) 555-1217 |
| Joe Smith | Hood Inc. | (949) 555-6511 |
| Bill Smith | TR Inc. | (949) 555-1219 |

The Contacts folder is your e-mail address book and information storage for the people and businesses you want to communicate with. Use the Contacts folder to store the e-mail address, street address, multiple phone numbers, and any other information that relates to the contact, such as a birthday or anniversary date.

AtlasBook™ - Sales Edition
Your Online Address Book with Maps, Directions, and Call Management Setup | Help | Trash Bin | Logout Welcome Angie NIM

| Home | Contacts | Leads | Accounts | Opportunities | Call History | Search | Find on Map | Directions | Reports |

Find on Map | Get Driving Directions | My Incoming Calls | My Outgoing Calls | My Missed Calls Search for: 1600

Get Driving Directions:                                                                 Thursday - July 10, 2003

[Search]

My Recent Contacts
My Recent Places

Last Activity:

- Michael Smith
- Angie Smith
- Steve Smith
- Dima Smith
- Mark Smith
- Acme Manufacturing
- Opportunity One
- Directions: 134 Franklin Terrance, MA 02568
- Map: 18872 Bardeen Ave, Irvine, CA 92612

1). Enter starting address or
1601 select from Recent Locations

Map an Address
1603
Recent Locations
[Recent Locatons ▼]
1605
Street Address
[          ]
1606
City  1607 State  1608 Zip Code
[   ] [   ] [   ]

Country
[United States ▼]

2). Enter destination address or
1604 select from Recent Locations

Map an Address
Recent Locations
[Recent Locatons ▼]

Street Address
[          ]

City    State    Zip Code
[   ]  [   ]   [   ]

Country
[United States ▼]

1609
[Get Directions]

AtlasBook™ - Sales Edition
Your Online Address Book with Maps, Directions, and Call Management Setup | Help | Trash Bin | Logout Welcome Angie NIM

| Home | Contacts | Leads | Accounts | Opportunities | Call History | Search | Find on Map | Directions | Reports |

Setup 2000

Setup: Phone Setup: Current Phone Assignments          Thursday - July 10, 2003

Search for:

[ Search ]

2001

| Phone Assignments | Activated | Remove from Account |
|---|---|---|
| (949) 254-4874 | 7/15/2003 12:11:20 PM PDT | Remove |
| (949) 254-4823 | 7/15/2003 12:11:20 PM PDT | Remove |
| (949) 254-4234 | 7/15/2003 12:11:20 PM PDT | Remove |
| (949) 254-4812 | 7/15/2003 12:11:20 PM PDT | Remove |

My Recent Contacts
My Recent Places

Last Activity:

- Michael Smith
- Angie Smith
- Steve Smith
- Dima Smith
- Mark Smith
- Acme Manufacturing
- Opportunity One
- Directions: 134 Franklin Terrance, MA 02568
- Map: 18872 Bardeen Ave, Irvine, CA 92612
- Lawrence Design
- Jersey Ware

AtlasBook™ - Sales Edition
Your Online Address Book with Maps, Directions, and Call Management Setup | Help | Trash Bin | Logout Welcome Angie NIM

| Home | Contacts | Leads | Accounts | Opportunities | Call History | Search | Find on Map | Directions | Reports |

Setup 2500

Setup: Administration Settings (Member Statistics)    Thursday - July 10, 2003

Search for:

[Search]

My Recent Contacts
My Recent Places

Last Activity:

- Michael Smith
- Angie Smith
- Steve Smith
- Dima Smith
- Mark Smith
- Acme Manufacturing
- Opportunity One
- Directions: 134 Franklin Terrance, MA 02568
- Map: 18872 Bardeen Ave. Irvine, CA 92612
- Lawrence Design
- Jersey Ware 2501
2502 Total Contacts: 34,024
2503 Total Disk Usage: 12,736 KB
2504 A|B|C|D|E|F|G|H|I|J|K|L|M|N|O|P|Q|R|S|T|U|V|W|X|Y|Z|123|All    2510
2505 Displaying Page 1 of 5 for Contacts (All)  2506  2507  2508  2509
Previous Page | Next Page

| Name | Username | Contacts | On the Phone | Disk Usage |
|---|---|---|---|---|
| Michael Smith | msmith@atlasbook.com | 50 | 50 | 50 KB |
| Angie Smith | asmith@atlasbook.com | 75 | 75 | 63 KB |
| Steve Smith | ssmith@atlasbook.com | 568 | 400 | 250 KB |
| Dima Smith | dsmith@atlasbook.com | 1253 | 536 | 520 KB |
| Mark Smith | msmith@atlasbook.com | 1253 | 1254 | 5120 KB |
| Anthony Smith | asmith@atlasbook.com | 1253 | 1248 | 520 KB |
| Joyce Smith | jsmith@atlasbook.com | 5368 | 1425 | 1250 KB |
| Bob Smith | bsmith@atlasbook.com | 1253 | 768 | 5210 KB |
| Matt Smith | msmith@atlasbook.com | 1253 | 1251 | 1250 KB |
| 2511 Joe Smith | jsmith@atlasbook.com | 1254 | 1251 | 3250 KB |

Records displayed per page: 5 | 10 | 25 | 50 | 75 | 100    Previous Page | Next Page A|B|C|D|E|F|G|H|I|J|K|L|M|N|O|P|Q|R|S|T|U|V|W|X|Y|Z|123|All

FIG. 25

METHOD AND SYSTEM FOR COLLECTING, SYNCHRONIZING, AND REPORTING TELECOMMUNICATION CALL EVENTS

This application claims priority from Provisional Application No. 60/493,704, titled "Method and System for Collecting, Synchronizing, and Reporting Telecommunication Call Events and Work Flow Related Information," filed on Aug. 8, 2003. the contents of which are incorporated herein by reference.

BACKGROUND

1. Field of Invention

This present invention relates to the capturing, processing, mapping, reporting, and displaying of telecommunication call events that occur on either landline or wireless telecommunication devices (i.e., POTS telephones, cellular telephones, 3G-based wireless data/telephones, etc.), where the information content of the telecommunication call events can be presented locally on the device or remotely on a desktop or laptop computer using a computer application or a web browser that can interface to an online networked server.

2. Description of the Related Art

Telecommunication devices, specifically wireless telephones, are achieving widespread use today. Such telecommunication devices are commonly used to establish communication between other telecommunication devices. Recently telecommunication devices are becoming more than just communication devices, but also a computing platform for executing applications similar to the early days of the personal computer era, where devices had limited memory and processing resources. The difference is that these new telecommunication devices, while currently provide a limited computing platform, also enable wireless data access to the Internet and expose the telephone's telephony functionality. These new telecommunication devices are well known to people that are skilled in the art.

Prior art systems, such as customer premises equipment (CPE) enable the storage capability of caller identification (Caller ID) information of incoming calls, assuming that said Caller ID information is not blocked. For example, Lucent Technologies produces a model ISDN 8520T CPE that keeps a log of unanswered incoming, answered incoming, and outgoing telephone calls. Each call has a time stamp associated with it so that unanswered calls can be distinguished from available calls that have Caller ID information. When the CPE is used with a switch, such as an ISDN PBX switch, the CPE will provide each caller's name if it is stored in the switch's database. As individuals that pay telephone bills know, all of this caller information is also preferably included in a customer's telephone bills for the purpose of billing information and is well known to people that are skilled in the art.

Customer Relationship Management (CRM) prior art applications provide a solution to understand customer related pipelines, such as sales or support team's pipelines. For sales, it is important to keep track of a company's Contacts, Accounts, and Opportunities. Every Account has a Contact or group of Contacts that are associated with the Account. Every Opportunity has one or many Accounts that are associated with the Opportunity and indirectly have Contacts that are associated with the Opportunity through a common Account or Accounts. Contacts, Accounts, and Opportunities have activities, such as telephone calls, that are associated with one or more of the Account, Opportunity, or Contact categories (i.e., a telephone call can be associated with a Contact that also has associations with an Account and an Opportunity). Prior art CRM systems are well known to people skilled in the art.

A problem with existing prior art CPE and switch systems is that they only provide a mechanism for capturing call logs at the switch that the telecommunication device interfaces with. This is not practical with wireless telecommunication devices, since acquiring access to a switch at a base station is not reasonable due to the large number of base stations necessary to create a cellular wireless network. Also, accessing the call logs directly from different wireless or landline carriers introduces interface and connection issues, since carriers use different standards that are not compatible with other carriers.

Another problem with accessing the call logs directly from a wireless or landline carrier is that each telecommunication carrier, which may be grouped in a local area or across an entire continent, would have to provide access to, or expose, call log information for their entire user-base on their networks. This introduces a significant privacy problem, in addition to requiring significant bandwidth to transport all of the users' call logs, since not all users on said networks will subscribe to this advanced service that integrates and associates call logs with database records.

Yet another problem is that call logging by the wireless or landline carrier only provides call logs specifically for billing purposes, and the advanced Telecommunication Call Events that the telecommunication device can provide are not provided. For example, this invention provides a Telecommunication Call Event to include the GPS position of the telecommunication device at the time the device received, missed, or initiated a telephone call, or during the entire duration of the telephone call.

An additional problem with existing call logging systems, such as the CPE, is that the centralized logging solution does not always have the capability of being disabled or turned off. Specifically, this is the case for carrier specific switches whose main function is to record calls for billing purposes. By handling the Telecommunication Call Event recording (i.e., call logging) functions on the telecommunication devices, the authorized user can have the ability to disable the call logging functionality simply and effectively.

It is yet another problem with the prior art system when a user owns or makes calls from multiple telecommunication devices (i.e., a landline telephone, a wireless telephone, etc.), specifically when the telecommunication devices are operated on different carrier networks, since interfacing with each call logging switch amongst all of the carriers that the telecommunication device connects with is very difficult and a daunting task. This problem is further exaggerated if the user owns a wireless telecommunication device with roaming capability and "roams" into a different wireless carrier network. With prior art systems, access to all possible roaming networks would be required to provide a continuous call logging solution.

Another problem with existing database applications, such as CRM applications, is that the user is required to manually enter the Telecommunication Call Event associations (i.e., such as telephone number associations) into database records, such as Contact data (i.e., vCARD), Accounts, or the like. Providing a system that autonomously updates the call history information would provide better real-time forecasting and reporting information. As people that are skilled in the art will agree, this significantly improves the effectiveness of such systems.

Until now, an adequate solution to these problems has eluded those skilled in the art. Thus, there exists a need to provide a solution that enables Telecommunication Devices to capture Telecommunication Call Events for enabling the association of Telecommunication Call Events with database records, which may include without limitation Contacts, Accounts, Opportunities, Forecasts, Leads, Tasks, Documents, Cases, other Events, or the like. This invention provides many important benefits for Telecommunication Devices which are an important and integral part of improving Work Flow-related processes.

SUMMARY OF THE INVENTION

It is an object of the present invention to provide a method and system for enabling the Telecommunication Device to capture all telephony-related events, denoted hereinafter as Telecommunication Call Events (TCE). In the preferred embodiment, the Telecommunication Call Events can include the telephony-related events without limitation as follows:
Telecommunication Call Events (Example):
 Telecommunication Device's Local Telephone Number and/or Unique Identifier (i.e., the telecommunication device's Electronic Serial Number (ESN), or the like).
 Incoming Call's Telephone Number and Related Caller-ID Information
  Related Caller-ID Information Includes:
   Blocked or Not Blocked Caller-ID Information (i.e., indicating if the Caller-ID information is hidden or visible).
   Telephone Number's Registered Name
    The Registered Name may be either a personal or business name. If it is a personal name, the Registered Name may include only the First Name, Surname, Middle Name, or any combination thereof. If the Registered Name is a Business, then the Business Name (i.e., DBA—"Doing Business As" Name) is typically provided.
   Telephone Number's Registered Address
   Telephone Number is registered to either a Landline or Wireless Telephone
 Missed Call's Telephone Number and Related Caller-ID Information
  Related Caller-ID Information Includes:
   Blocked or Not Blocked Caller-ID Information (i.e., indicating if the Caller-ID information is hidden or visible).
   Telephone Number's Registered Name
    The Registered Name may be either a personal or business name. If it is a personal name, the Registered Name may include only the First Name, Surname, Middle Name, or any combination thereof. If the Registered Name is a Business, then the Business Name (i.e., DBA—"Doing Business As" Name) is typically provided.
   Telephone Number's Registered Address
   Telephone Number is registered to either a Landline or Wireless Telephone
 Outgoing Call's Telephone Number
 Call Duration for either Incoming or Outgoing Telephone Calls
 Roaming or Non-Roaming Call Indicators for either Incoming or Outgoing Telephone Calls
 Local or International Call Indicators for either Incoming or Outgoing Telephone Calls
 Telephone Call Start Event and the Time associated with said Event
 Telephone Call End Event and the Time associated with said Event
 Completed or Incompleted Telephone Calls
 Forwarded or Redirected Telephone Call Event and the Time associated with Said Event
 Spatial Coordinates on the Earth (i.e., GPS coordinates or the like as well known to those skilled in the art) representing the location of the Telecommunication Device at the Start of the Call
 Spatial Coordinates on the Earth (i.e., GPS coordinates or the like as well known to those skilled in the art) representing the location of the Telecommunication Device during the Entire or Partial Duration of the Call
  In this invention, the Spatial Coordinates can be captured in real-time at varying position sample periods or triggered based on the distance traveled or the like as known to those skilled in the art.
 Spatial Coordinates on the Earth (i.e., GPS coordinates or the like as well known to those skilled in the art) representing the location of the Telecommunication Device at the End of the Call
 Spatial Coordinates on the Earth (i.e., GPS coordinates or the like as well known to those skilled in the art) representing the location of the Telecommunication Device's Wireless Base Station(s) or Central Office at the Start of the Call
 Spatial Coordinates on the Earth (i.e., GPS coordinates or the like as well known to those skilled in the art) representing the location of the Telecommunication Device's Wireless Base Station(s) or Central Office during the Entire or Duration of the Call
  With a typical wireless Telecommunication Device, it is possible for the telecommunication device connection to be transferred from one wireless base station to another during a telephone call (i.e., for either voice or data calls). In this invention, the Telecommunication Device will store the Spatial Coordinates on the Earth (i.e., GPS coordinates or the like as well know to those skilled in the art) representing the location of each wireless base station the telecommunication device connection was transferred to and the associated time of the transfer or "hand-off" time.
 Spatial Coordinates on the Earth (i.e., GPS coordinates or the like as well know to those skilled in the art) representing the location of the Telecommunication Device's Connected Wireless Base Station(s) or Central Office at the End of the Call
 Distress Call (i.e., if the call is a 911 or E-911 call or the like)
 Information Call (i.e., if the call is a 411 call or the like)
 Operated Assisted Call (i.e., if the call is a 611 call or the like)
 Voice Mail Call (i.e., such as *86 on most wireless carriers in the United States)
 Data or Voice Call
 Digital or Analog Call
 Dormancy State (i.e., if the call is temporarily quiescent, but capable of being activated)
 Phone Power-On Event and the Time associated with said Event
 Phone Power-Off Event and the Time associated with said Event
 Low Battery Event and the Time associated with said Event
 Signal Power (i.e., SNR, Eb/No, or the like, etc.) of the Telecommunication Device and the Time associated with said Event Entire or Portion of the Recorded Voice Message of the Telecommunication Device during a Telephone Call and the Start Time, End Time, and Duration of the said Telephone Call It is an object of the present invention to provide a method and system for enabling the capturing and logging of Telecommunication Call Events on the Telecommunication Device. As Telecommunication Call Events occur, they are registered and stored or recorded to a data storage device, located either locally within the Telecommunication Device or externally on a remote storage device connected to the Telecommunication Device through either a wired connection, such as the Internet/Intranet/Extranet, wireless connection, infrared connection, optical connection, or any combination of the aforementioned or similar connections (i.e., wired, wireless, infrared, optical, or the like connection). In one embodiment, these local storage devices also include a flash memory storage device, hard disc drive, optical memory, non-volatile memory, or the like as well known to those skilled in the art. As illustrated, it is also an object of the present invention to enable the capability so that the storage of Telecommunication Call Events, which typically occur in real-time, can be stored on a remote networked storage device. In one embodiment, the Telecommunication Call Events are packaged and pushed directly to an online Internet-connected networked server that is connected to the Telecommunication Device using first a wireless connection through a wireless base station and then through the Internet to an online networked server.

It is an object of the present invention to provide a method and system for enabling the synchronization or transfer of said Telecommunication Call Events, where the synchronization or transfer of said Telecommunication Call Events are initiated based on 1). Real-Time Telecommunication Call Events, 2). Scheduled Ad-Hoc and/or Reoccurring Time Intervals, and/or 3). Locally or Remotely Initiated Triggered Events. The Telecommunication Call Events are synchronized or transferred from the Telecommunication Device to 1). a Centralized Server Computing System (i.e., peer-to-server connection), 2). a Distributed Server Computing System (i.e., peer-to-multiple servers), and/or 3). a Personal Computing System using a variety of different transport mediums, such as a wired, wireless, infrared, optical, or the like connection. For example in one embodiment, the Telecommunication Device can synchronize or transfer its Telecommunication Call Events using a peer-to-peer (P2P) configuration directly to another computing platform, such as a local PDA using a wireless Bluetooth connection. In another embodiment, the Telecommunication Device can synchronize or transfer its Telecommunication Call Events using a peer-to-server (P2S) configuration to an online centralized server for later retrieval of said call events and/or work flow status information. In a similar embodiment, the online server embodies a distributed server system for the purpose of enabling better Reliability, Availability, and Scalability (RAS) of the synchronization, transfer, or retrieval of said Telecommunication Call Events and/or work flow status information.

It is an object of the present invention to provide a method and system for enabling the synchronization or transfer of said Telecommunication Call Events in Real-Time from the local Telecommunication Device.

With advanced wireless telecommunication devices (such as devices that provide simultaneous data and voice capability, etc.) or telecommunication devices with out-of-band data functionality (such as SMS functionality or the like), the transfer of Telecommunication Call Events can occur in Real-Time to 1). a centralized server computing system, 2). a distributed server computing system, and/or 3). a personal computing system. This particular object allows the storing of the Telecommunication Call Events to the local telecommunication data storage device for the purpose of ensuring the delivery of the Telecommunication Call Events. In most scenarios, temporarily storing the Telecommunication Call Events is the preferred method of operation in order to provide a reliable data transfer, which is typically necessary in a wireless environment. Whenever a Telecommunication Call Event occurs, the event is transferred, synchronized, or "pushed" in real-time to the accompanying receiving device(s). After the real-time transfer of the Telecommunication Call Events has occurred, a copy of the Telecommunication Call Event(s) may be temporarily stored locally for added reliability until an acknowledgement of the receipt of the specific Telecommunication Call Event(s) is received by the Telecommunication Device. Once the Telecommunication Device has received an acknowledgement or confirmation from the receiving device(s), the Telecommunication Device can then safely delete or remove the sent Telecommunication Call Event(s). If the Telecommunication Device did not receive an acknowledgment from the receiving device(s), the Telecommunication Device will first store, then forward or resend the data at a later time. This store-and-forward operation will continue until the Telecommunication Device receives an acknowledgement from the receiving device(s) confirming the delivery of the Telecommunication Call Event(s) for the specific Telecommunication Device. This method provides a mechanism for ensuring that the transferred Telecommunication Call Events will reach their desired destination in a wireless environment that periodically has no coverage area or is subject to coverage loss due to a number of various reasons, such as multipath, blockage, etc. In one embodiment, when a call is received, that call's telephone call event and Caller ID information (e.g., telephone number of caller, telephone number of called telephone, time the call was started, voice call event, received call event, non-roaming call event, etc.) is transferred, synchronized, or "pushed" in real-time to an online server.

It is an object of the present invention to provide a method and system for enabling the Telecommunication Call Events synchronization or transfer process to be scheduled to occur at various reoccurring times or ad-hoc. Typically, for the Scheduled Event Model, the Telecommunication Call Events are recorded to the Telecommunication Device's data storage device in real-time as they occur, such as in a Flash Memory storage device, hard disc drive, or the like as well known to those skilled in the art. At a predetermined or scheduled time, the accumulated Telecommunication Call Events are synchronized or transferred to 1). a centralized server computing system (i.e., peer-to-server connection), 2). a distributed server computing system (i.e., peer-to-multiple servers), and/or 3). a personal computing system. In one embodiment, at the top of every hour the accumulated Telecommunication Call Events are synchronized or transferred to an online server.

It is an object of the present invention to provide a method and system for enabling the Telecommunication Call Events synchronization or transfer process to be triggered based on the detection of a local and/or remote event. In this present invention, locally triggered events may include Telecommunication Call Events, pressing a key on the Telecommunication Device, power-on event, low battery event, reaching a specified storage size limit or storage threshold for the Telecommunication Device, signing-in or executing an application or sub-process running on the Telecommunication Device, or the like. Externally triggered events may include receiving an E-Mail, SMS message, or TCP/IP or UDP command packet to remotely initiate the synchronization or transfer process. This command packet (for example, a SMS message) may also utilize authentication and authorization protocols and procedures in order to correctly identify and authenticate that the user or process which remotely initiated the synchronization or transfer process has the proper authority and credentials to initiate such a request.

It is an object of the present invention to provide a method and system for notifying and providing a confirmation message to the Telecommunication Device that recently had a remotely-initiated synchronization or transfer process performed. This object of the present invention apprises the owner(s) or user(s) of the Telecommunication Device that a remote synchronization or transfer process had recently been completed by an authorized user that had the appropriate credentials to make such a request. The confirmation message may be digitally signed to authenticate that the sender of the confirmation message is an authorized remote system or user that initiated the synchronization request. This present invention allows the confirmation message to be sent directly to the Telecommunication Device's unique address, such as an SMS address (i.e., telephone number of the Telecommunication Device, such as 9495551212@wirelesscarrier.com), in addition to numerous other unique addresses that are associated with the Telecommunication Device. These additional addresses may include the owner's or user's E-Mail address for the Telecommunication Device, or the IT administrator's E-Mail address that maintains the Telecommunication Device, or any predefined unique address (i.e., E-Mail Address, Pager Number, Telephone Voice Mail Address, or the like) that was set by a user that has proper authority and credentials for the Telecommunication Device.

It is an object of the present invention to provide the synchronization or transfer process of Telecommunication Call Events or data related to Telecommunication Call Events using a wired, wireless, infrared, optical, or similar connection. For example, in one embodiment, a Telecommunication Call Events log can be transferred to an online networked server via both a wireless connection, such as when using a cell phone to a base station, and then through the Internet to an online networked server. In another embodiment, the connection to the Internet can also be enabled first through a serial, USB, Firewire, or the like connection that is connected to a desktop or laptop computer, and then through the Internet connection which is established from the desktop or laptop computer. In a similar embodiment, the connection can also be established wirelessly to either the desktop or laptop computer, such as using a Bluetooth connection. In a different embodiment, the wireless connection can be established using a Local Area Network (LAN), such as in an office environment. In a similar embodiment, the wireless connection can be established using a Wide Area Network (WAN), as with a cellular device that is wirelessly connected to a nearby base station which has an established connection to the online networked server by means of an Internet connection.

It is an object of the present invention to provide a method and system to provide the association of either Contact(s) to Telecommunication Call Events and/or Telecommunication Call Events to Contact(s), in which the Contact(s) are stored and referenced from a database, either locally or through an online centralized or distributed server. The Contact fields are searchable and capable of being correlated with the Telecommunication Call Events. For example, in one embodiment, a Telecommunication Device received a call from telephone number (732) 792-4265 on Jun. 17, 2001 at 4:30 PM EST. In this embodiment, the Telecommunication Device received said telephone call and synchronized the Telecommunication Call Events information (such as, but not limited to, the telephone number of caller, telephone number called, time stamp when call was started, call duration, time stamp when call was ended, voice call, received call event, non-roaming call, etc.) to an online networked server. In this embodiment, a user is able to view using a web browser which Contact in their database initiated the call. The server provided this functionality by correlating the received Telecommunication Call Events which contained the caller's telephone number with the telephone number that was stored in the user's Contact database. This same object provides the capability for viewing said correlated contacts for said Telecommunication Call Events either locally on the Telecommunication Device or remotely, such as from another computing device or other Telecommunication Device.

It is an object of the present invention to provide a method and system to enable users within a predefined group to share their individual Contact databases with each other for the purpose of providing a more complete and combined set of Contact Information (i.e., vCard, which automates the exchange of information typically found on a traditional business card) for the purpose of correlating said Contact Information with Telecommunication Call Events. Each Contact entry (i.e., vCard) has various user-defined permissions associated with it that define how the Contact entry can be used by the system and users within a group. It is another object of the present invention to allow group administrators, or similarly authorized users, to assign permission control to users within the group. This permission control allows specified users to perform search queries, and view or edit other users' Contact Information within their organization. Every vCard contained within the group has a pre-defined owner of the Contact data where the owner of said Contact data is provided with inherent default access permissions unless otherwise designated by the administrator of the group or user. The permissions model includes, but is not limited to, the following permission attributes for each Contact entry: Full Control, Read-Only, Search Enabled/Disabled, and Modify.

It is an object of the present invention to provide a method and system to search all of the fields contained in the Contact Information (i.e., vCard) for the purpose of correlating and matching with Telecommunication Call Events either locally in the Telecommunication Device or remotely on the server or other computing device.

It is an object of the present invention to provide a method and system to provide the association of Telecommunication Call Events with any public or private database record, specifically with the association of either White Pages or Yellow Pages (i.e., Points of Interest (POI)) information with Telecommunication Call Events and vise-versa. It should be noted that White Pages and Yellow Pages information is very similar to vCard information with minor field variations and a different data compilation process. The White or Yellow Pages data fields are searchable and capable of being correlated with Telecommunication Call Events. In one embodiment, a Telecommunication Device received a call from telephone number (732) 792-4265 on Jun. 17, 2001 at 4:30 PM EST. In this embodiment, the Telecommunication Device received said telephone call and synchronized the Telecommunication Call Events information (such as, but not limited to, the telephone number of caller, telephone number of called, time stamp when call was started, call duration, time stamp when call was ended, voice call, received call event, non-roaming call, etc.) to an online networked server. Using a web browser, a user is able to view information about the White Pages (i.e., consumers and businesses) or Yellow Pages (i.e., business) listing that initiated the call using the server's capability to correlate the received Caller-ID provided telephone number with the telephone number stored in the White or Yellow Pages database listing. This same object provides the capability for viewing said correlated White or Yellow Pages database listing for said Telecommunication Call Events either locally on the Telecommunication Device or remotely, such as from another computing device or other Telecommunication Device.

It is an object of the present invention to provide a method and system to search all of the fields contained in any database record or field for the purpose of correlating and matching with Telecommunication Call Events either locally in the Telecommunication Device or remotely on the server or other computing device.

It is an object of the present invention to provide a method and system to log and process Telecommunication Call Events, such as a telephone number that the Telecommunication Device is able to establish a connection with while utilizing connections that are based on various types of connections and protocols, such as PSTN, CDMA, GSM, GPRS, iDEN, TCP/IP, UDP, or the like. This includes, but is not limited to: International Access Numbers, International Direct Dialing (IDD) prefix including the Destination Country Code and Phone Number, Standard Phone Numbers, International Phone Numbers, Information Call (411), Operated Assisted Call (611), Distress Call (911), *69, *86, 11-digit phone numbers in the US, *66, or the like.

It is an object of the present invention to provide a method and system for the association of Telecommunication Call Events with Contacts that have other threads or associations with additional records. This object allows for the indirect correlation of Telecommunication Call Events with these indirectly linked records, which include, but limited: Accounts, Opportunities, Forecasts, Leads, Tasks, Documents, Cases, other Events, or the like. In one embodiment, in a Customer Relationship Management (CRM) application, a Contact is associated or linked to an Account. An Account (i.e., such as a Business Customer) may have a plurality of Contacts that are associated or linked with it (i.e., such as a business account having multiple points of contact or representatives). When viewing either the Contact or Account information, it is possible with this invention to view at a glance the "Activity History" for either the Contact or Account. The Activity History can display Telecommunication Call Events that are correlated with said Contact or Account, thus providing a detailed snap-shot of the recent interactions with the Contact or Account. It should be appreciated by those skilled in the art that the users of the group do not have to manually update their calls with Contacts of various Accounts or directly with the Accounts as with prior art systems, since this invention provides an automated method and system for updating said Activity History automatically.

It is an object of the present invention to provide a method and system that enables notifications that are triggered by Telecommunication Call Events which are associated or linked to either a single or plurality of database records for the purpose of updating said database records by means of said notification. The notifications relate information or content to said Telecommunications Call Events. The notification can be delivered to the local Telecommunication Device and/or a remote computing device. These notifications can be displayed 1). in real-time while a telephone call is in progress, 2). immediately after a telephone call, 3). upon the execution of an application, process, or by opening an application window or clicking on an application link (i.e., such as a URL in a web browser), 4). at a predefined scheduled time period, either once or at reoccurring intervals, 5). at a specific geographic location or within a geographic range or area, 6). upon receiving an e-mail, SMS message, or instant message, 7). upon receiving a page, and/or 8). based on a user's current presence or status or a change in presence or status, such as Available, Busy, On the Phone, etc., or the like. In this same object of this invention, the invention provides notifications that contain associations, references, or links to database records that are somehow correlated to the recent Telecommunication Call Events, such as by a telephone number, on the Telecommunication Device that is registered with the user. In one embodiment, a user receives a telephone call on the wireless Telecommunication Device from a Contact at a major Account called "Acme Manufacturing". After the call has concluded, the system provides a notification display on the user's Telecommunication Device with a link to: 1). the Contact Information (i.e., vCard) for the Contact at "Acme Manufacturing" that called, 2). the "Acme Manufacturing" Account information, and 3). the opportunity information for the "Acme Manufacturing" Account. By means of the providing these three links (i.e., one for the Contact, one for the Account, and one for the Opportunity), the user of the Telecommunication Device is able to update the information that had changed due to the telephone call conversation that was privy between both calling parties. The user is then able to update either the caller's Contact information (i.e., the preferred Contact fields are illustrated in the preferred embodiments of the invention), such as a new telephone number, mail address, contact description, or the like. The user is also able to update the Account related information, during or after the telecommunication call, that was associated or had some degree of correlation to the previous Telecommunication Call Events, such as including, but not limited to the following:
    Account Name
    Phone Number
    Parent Account Information
    Website
    Account Number
    Ticker Symbol
    Type (i.e., such as private, public, etc.)
    Industry: (i.e., Telecommunications, Media, Manufacturing, etc.)
    Number of Employees
    Annual Revenue
    SIC Code
    Billing Addresses
    Voice Notes or Memos
    Text Notes or Memos
    Images
    Customizable Forms (i.e., Account Information, Opportunity Information, Contact Information such as vCard Information, Field Specific Forms, or the like, that is related to the Telecommunication Call Event)

The user is also capable of updating the Opportunity Information that was associated or had some degree of correlation to the previous Telecommunication Call Events, such as including, but not limited to the following:
    Opportunity Information:
        Primary Information
            Opportunity Owner (i.e., Contact Owner)
            U Opportunity Name
            Account Name (i.e., the Account that is linked to this Opportunity)
            Type: (i.e., new, existing, etc.)
            Lead Source Deal Amount (i.e., the size of the deal)
Status (i.e., Open, Pending, Closed and Close Date)
Next Steps (i.e., Need estimate Update, etc.)
Stage (i.e., Needs Analysis, Proposal/Price Quote, Closed Lost, Negotiation/Review, etc.)
Probability (%): (i.e., 80%, 90%, etc.)
Description In a similar embodiment of this invention, the user received the notification while the call was in progress on their laptop computer and was able to update the information during the course of the conversation.

An additional part of this object provides for a user that calls or receives calls from a corresponding Telecommunication Device to receive a notification event based on recent Telecommunication Events that were correlated with database records. These notification events include pending alerts or To-Do tasks apprising the user of the Telecommunication Device that un-correlated information needs to be updated, based on recent Telecommunication Events that the system is not able to update and correlate autonomously. In one embodiment, a user receiving or making a telephone call to a single or group of users receives a notification event that includes a pending To-Do task after that call has been terminated, determined by Telecommunication Call Events.

The pending To-Do task requires the user to update the notes information for that contact in order to describe the call, through the means of entering information into text entry forms that are specific to the user's business, or by updating the deal flow of the account information for the particular account that is associated with the telephone number (i.e., Telecommunication Call Event). In another embodiment, while the telephone call is in progress a user receives a reminder to update text entry forms about the contact they are having a conversation with, such as updating the sales projections for the current account that is associated with the user. In another embodiment, after a phone call has concluded, the authorized user of the Telecommunication Device will be apprised, by the Telecommunication Device's program that is running on said device, that a user should create voice-recorded notes in reference to the phone call. In a similar embodiment, after a phone call has concluded, the Telecommunication Device's application that is running on said device will notify the user if they wish to copy and save for later access a part of, or the entire, recorded voice phone call and associate it with the contact corresponding to the called or received phone number. The recorded phone call can reside locally on the Telecommunication Device and can also be synchronized or transferred to the online server system for access via a web browser or custom application program running on a computing device which is associated with various database records, such as vCard, Account Information, Opportunity Information, or the like.

It is an object of the present invention to provide a method and system that enables database records that have none or old time-stamped references to Telecommunication Call Events for the purpose of triggering notifications based on a predefined temporal threshold for the aging of each database record. This notification event can also be based on the frequency of Telecommunication Call Events that relate to a database record. For example, in one embodiment an Account was established with a company that represents a large Opportunity for the business to sell their product to.

The account has a group of associated Contacts that are the key decision makers of the Account. Since time may be critical to closing this sale for this Account, this invention allows an aging trigger event to be defined and triggered if a user within the organization does not call the telephone numbers of any Contacts who are associated with the Account within the predefined time limit set by the administrator of the organization. In this embodiment, this can be used for capturing the Telecommunication Call Events for a particular user and can be applied to users in the organization or department, or to a single user that owns or uses a Telecommunication Device upon which the application is executed. In another embodiment, a user of an organization is required to call an Account at least once a week. If the user does not perform the task of calling the Account's Contact (i.e., from their vCard data) a notification will be sent to the administrator, or to the user that initiated the event, illustrating that the frequency of calls to this Account for the particular user fell below the set threshold of calls to this Account for past predefined period of time.

It is an object of the present invention to provide a method and system that enables only one unique user account to be associated with one or many unique Telecommunication Devices. This invention allows multiple users to be associated with a single Telecommunication Device. However the preferred method of this invention is to allow only one user account to be assigned to multiple unique Telecommunication Devices (i.e., since users typically have more than one Telecommunication Device). This object of this invention also enables the prevention of a Telecommunication Device from being registered by multiple user accounts. This guarantees that Telecommunication Call Events that occur can be correlated with one and only one user account at a time. In one embodiment, when a user executes an application on the Telecommunication Device, the application will send a unique identifier, such as an ESN number, telephone number, or the like, to an online serer that will register the Telecommunication Device with the registered user that authenticated themselves and executed the application.

It is an object of the present invention to provide a method and system that displays an outgoing call history log of recent Telecommunications Call Events on a Telecommunication Device or other computing device, such as a desktop or laptop personal computer. This invention provides no limit on the number of outgoing calls that can be displayed. This object of this invention enables the display of outgoing call history, including additional information and/or references or links that are associated with the outgoing call history log item(s) of recent Telecommunication Call Events for a particular or group of Telecommunication Device(s). These references or links connect Telecommunication Call Events with database records through the use of common keys present in both the Telecommunication Call Events and the database records. This invention allows partial or exact matches of common keys. Common keys include Telecommunication Call Events, or the like. For every outgoing call history item, typically denoted as a Telephone Number, other information can be displayed through this invention, such as, but not limited to the following Contact informational fields that are correlated with the Telephone Number: Title, First Name, Middle Name, Last Name, Suffix, Company, Department, Job Title, Street Address, Street Address 2, Street Address 3, City, State, Postal Code, Country, Address' Latitude, Address' Longitude, Address' Altitude, etc. A plurality of unique Contact records can be displayed in this invention.

In addition to displaying the most prominent Contact Information, links (i.e., known as shortcuts) are provided for allowing users to update various additional database records that have an association with the Telecommunication Call Event. These additional links or shortcuts include, but are not limited to the following database records: Accounts, Opportunities, Forecasts, Leads, Tasks, Documents, Cases, other Events, or the like. It is an object of this invention to allow the updating or populating of the outgoing call history log information by 1). real-time updates as Telecommunication Call Events are processed, 2). scheduled ad-hoc and/or reoccurring time intervals, and/or 3). running an application or process such as a button or link (i.e., URL) that initiates a call history log update from an online server or local computing platform. In this same object of this invention, it is possible to read database records, such as the Opportunities record database, which has a common association using the Telecommunication Call Events as the common key. Using this link or shortcut, the user is able to quickly and effectively review and update database records that are related to recent Telecommunication Device activities without having to first search for said database record information. The retrieval of additional database records can either be cached locally or accessed upon demand. This object of the invention also provides for mapping any database record that has geographical information associated with it through the call history.

It is an object of the present invention to provide a method and system that enables the Telecommunication Device or other computing device, such as a desktop or laptop personal computer, to display an incoming call history log of recent Telecommunications Call Events. This invention provides no limit on the number of incoming calls that can be displayed. This object of this invention enables the display of incoming call history including additional information and/or references or links that are associated with the incoming call history log item(s) of recent Telecommunication Call Events for a particular or group of Telecommunication Device(s). These references or links connect Telecommunication Call Events with database records through the use of common keys present in both the Telecommunication Call Events and the database records. This invention allows partial or exact matches of common keys. Common keys include Telecommunication Call Events, or the like. For every incoming call history item, typically denoted as a Telephone Number, other information that can be displayed through this invention includes, but is not limited the following Contact information fields that are correlated with the Telephone Number: Title, First Name, Middle Name, Last Name, Suffix, Company, Department, Job Title, Street Address, Street Address 2, Street Address 3, City, State, Postal Code, Country, Address' Latitude, Address' Longitude, Address' Altitude, etc. A plurality of unique Contact records can be displayed in this invention.

In addition to displaying the most prominent Contact Information, links (i.e., known as shortcuts) are provided for allowing users to update various additional database records that have an association with the Telecommunication Call Event. These additional links or shortcuts include, but are not limited to the following database records: Accounts, Opportunities, Forecasts, Leads, Tasks, Documents, Cases, other Events, or the like. It is an object of this invention to allow the updating or populating of the incoming call history log information by 1). real-time updates as Telecommunication Call Events are processed, 2). scheduled ad-hoc and/or reoccurring time intervals, and/or 3). running an application or process such as a button or link (i.e., URL) that initiates a call history log update from an online server or local computing platform. In this same object of this invention, it is possible to read database records, such as the Opportunities record database, which has a common association using the Telecommunication Call Events as the common key. Using this link or shortcut, the user is able to quickly and effectively update database records that are related to recent Telecommunication Device activities without having to first search for said database record information. The retrieval of additional database records can either be cached locally or accessed upon demand. This object of the invention also provides for mapping any database record that has geographical information associated with it through the call history.

It is an object of the present invention to provide a method and system that enables the Telecommunication Device or other computing device, such as a desktop or laptop personal computer, to display a missed call history log of recent Telecommunications Call Events. This invention provides no limit on the number of missed calls that can be displayed. This object of this invention enables the display of missed call history including additional information and/or references or links that are associated with the missed call history log item(s) of recent Telecommunication Call Events for a particular or group of Telecommunication Device(s). These references or links connect Telecommunication Call Events with database records through the use of common keys present in both the Telecommunication Call Events and the database records. This invention allows partial or exact matches of common keys. Common keys include Telecommunication Call Events, or the like. For every missed call history item, typically denoted as a Telephone Number, other information can be displayed through this invention, including, but not limited to the following Contact information fields that are correlated with the Telephone Number: Title, First Name, Middle Name, Last Name, Suffix, Company, Department, Job Title, Street Address, Street Address 2, Street Address 3, City, State, Postal Code, Country, Address' Latitude, Address' Longitude, Address' Altitude, etc. A plurality of unique Contact records can be displayed in this invention. In addition to displaying the most prominent Contact Information, links (i.e., known as shortcuts) are provided for allowing users to update various additional database records that have an association with the Telecommunication Call Event.

These additional links or shortcuts include, but are not limited to the following database records: Accounts, Opportunities, Forecasts, Leads, Tasks, Documents, Cases, other Events, or the like. It is an object of this invention to allow the updating or populating of the missed call history log information by 1). real-time updates as Telecommunication Call Events are processed, 2). scheduled ad-hoc and/or reoccurring time intervals, and/or 3). running an application or process such as a button or link (i.e., URL) that initiates a call history log update from an online server or local computing platform. In this same object of this invention, it is possible to read database records, such as the Opportunities record database, which has a common association using the Telecommunication Call Events as the common key. Using this link or shortcut, the user is able to quickly and effectively update database records that are related to recent Telecommunication Device activities without having to first search for said database record information. The retrieval of additional database records can either be cached locally or accessed upon demand. This object of the invention also provides for mapping any database record that has geographical information associated with it through the call history.

It is an object of the present invention to provide a method and system that enables the Telecommunication Device to update the local address book based on a statistical analysis of the Telecommunication Call Events associated with a user (i.e., since the user can own multiple Telecommunication Devices) or with the Telecommunication Device. The Telecommunication Device's address book is an array of Contacts that can be stored locally on the Telecommunication Device for the purpose of accessing the vCard contents in real-time without a high-degree of access latency as typically observed when requesting data through a wireless network. This object of this present invention provides the means for calculating which Contacts are associated with a Telecommunication Device's Telecommunication Call Events and the frequency and age of updates for the purpose of ordering the user's Contact (i.e., vCard) information from the most active to the least active for a given user. This ordering is calculated in real-time as Telecommunication Call Events are recorded. Since most Telecommunication Devices have a finite number of Contact (i.e., vCard) allocations that can be stored locally in the Telecommunication Device, a maximum number of address book Contacts has to be established and may vary across different Telecommunication Devices. Since the user of the Telecommunication Device can have a larger base of Contacts than the Telecommunication Device can support, this maximum number will artificially limit how many Contacts can be synchronized or transferred to the Telecommunication Device.

The synchronization or transfer process for updating the Telecommunication Device's address book can be implemented 1). in real-time as Telecommunication Call Events are processed, 2). at scheduled ad-hoc and/or reoccurring time intervals, 3). upon running an application or process such as a button or link (i.e., URL) that initiates an address book update, and/or 4). based on a percentage difference threshold in which the current address book listing differs from the new address book listing, or the like. Thus this object of this invention uses Telecommunication Call Events to calculate and then populate which Contacts are stored in the local address book of the Telecommunication Device. This object of this invention also provides a provision for certain high-priority Contacts, such as emergency Contacts, to override other lower-priority Contacts, in the event that these Contacts normally would not be stored in the address book due to storage size limitations, but are required to be store locally on the Telecommunication Device.

It is an object of the present invention to provide a method and system that enables the correlation or matching and/or extrapolation (i.e., partial matching) of Telecommunication Call Events with either local and/or remote database records. Since Telecommunication Call Events vary across different Telecommunication Devices, Telephone (i.e., landline) and Wireless Carriers, Telecommunication Standards (i.e., CDMA, GSM, iDEN, etc.), or the like, it is paramount to provide a means to correlate either exact or partial matches between Telecommunication Call Events and database records. This object of this invention provides the means to allow partial match correlations between Telecommunication Call Events and database records, such as Contact, Account, or the like. The following points provide additional dependent objects that increase the accuracy of the matching of exact and/or partial match correlations with said database records:

1. Extrapolate NPA (i.e., area code) Information for Telecommunication Events (i.e., Caller-ID) when said Telecommunication Events do not provide NPA information for local calls. Thus, it is an object of the invention to add NPA information to Telecommunication Events that do not include said NPA information, where the NPA information is derived from the local telephone number of the Telecommunication Device.
2. Allow partial matches for Telecommunication Devices contained within a Private Branch Exchange (PBX) system. For example, ANI (Automatic Number Identification or Caller-ID) provides the Direct Inward Dialing (DID) trunk from the PBX on which the call originated and not the actual PBX extension of the Telecommunication Device. Thus, it is an object of this invention to allow the partial match searches for telephone numbers that have a high degree of correlation to a particular or set of database records (i.e., Contact, Account, etc.). These partial correlations can be presented to the user in a different manner than exact match correlations.
3. Provide a mechanism that allows the user to confirm and/or correct partial match correlations and enabling the user to select the correct database record or records to associate with the exact or partial Telecommunication Call Event (e.g., a user can select from a list the Contact, Account, or the like, that is associated with the telephone number, etc.).

It is an object of the present invention to provide a method and system that enables the user to match or choose which Telecommunication Call Events are to be associated with various database records. This can occur on the Telecommunication Device after a Telecommunication Call Event has ended (e.g., the end of a phone call), during a Telecommunication Call Event (e.g., during a phone call), or when a user authenticates and is authorized to sign in to a remote application, such as a custom application or web browser, for the purpose of updating PIM (Personal Information Management), or the like, information. For example, in one embodiment, a user can receive a number of phone calls from users that do not have any Caller-ID information and thus no phone number is provided. When the user signs in to their organization using a standard web browser, a list of uncorrelated Telecommunication Call Events will be listed so that the user can manually associate the uncorrelated Telecommunication Call Events with current database records, such as vCard contacts, or so that the user can create a new database record, such as a user vCard or business Account, for the purpose of associating the Telecommunication Call Event with a database record for reports, notifications, or like.

It is an object of the present invention to provide a method and system that provides a plurality of reports that utilize the Telecommunication Call Events for either a particular Telecommunication Device and/or user (i.e., which may use a plurality of Telecommunication Devices). These reports include numerous combinations of the Telecommunications Call Events, in addition to correlating said Telecommunication Call Events within a plurality of database records. Reports can be a critical part of this invention, as those skilled in the art will agree. Making use of a multitude of Telecommunication Call Events is only possible by recognizing and illuminating the patterns and frequency of Telecommunication Call Events with their respective database records to the end user in a clear and simple format, which would not otherwise be possible if only the raw data is displayed. The invention provides a plurality of reports, without limitation, and including the following:

Incoming Calls Report
Outgoing Calls Report
Missed Calls Report
Contact Reports
    Contact Call History
    Last Time Group of Contacts were Called
    Total Contact Call Time
    Contact Normalized Call Time vs. User's Total Call Time
    % of Calls that are Personal vs. Business
New Account Report—Customers that are being Serviced
Active Contacts—Current Contacts that are Active
Neglected Contacts—Contacts that need Attention
Active Accounts—Current Accounts that are Active
Neglected Accounts—Accounts that need Attention
Aging Reports—Contacts, Accounts, Opportunity, Leads, Forecast Return Call Response Time—The amount of time between a Contact calling a user and leaving a voice mail message, to the time the user returned the call to the Contact.

Sales Reports

Account and Contact Reports

Opportunity and Forecast Reports

Support Reports

Lead Reports

Fields Service Reports

Wireless Airtime Billing Report—Associated wireless airtime charges and the user appropriate account.

Opportunity ROI Report

Based on recorded call information related to a specified Account's Opportunity that has Contacts associated with said Account. Each Account Opportunity has a monetary value and this report provides the Telecommunication Call Events information related to said Opportunities, such as including, but not limited to: Time of Calls, Frequency of Calls, Frequency of Return Calls from Contact, Return Call Response Time, or the like.

It is an object of the present invention to provide a method and system that provides a plurality of maps of varying resolution and size reporting events, patterns, and/or frequencies of Telecommunication Call Events and their respected associated database records illustrating a spatial thematic representation of the data. In one embodiment, it is possible to spatially view the call history for a particular user and their Telecommunication Devices over a given period of time. In another embodiment, a thematic map of Accounts that the business organization has won or closed is illustrated spatially, which graphically depicts the amount of calls and visits made in the process of winning each Account.

It is an object of the present invention to provide a method and system that provides a plurality of alerts and exceptions that are triggered based on the changes, modifications, or creation of Telecommunication Call Events and related database records. Alerts and Exceptions are configured by authorized users with the appropriate privileges to create, modify, or remove alert and exceptions for individual users of Telecommunication Devices. For example, in one embodiment, a user can request to be alerted when a specified Telecommunication Call Event occurs, such as to be notified when a call is made to a specified telephone number and/or NPA/NXX designation, such as with use a PBX phone system, or when a particular Contact is called or the Contact calls the user at one of their Telecommunication Devices (i.e., denoted as Telefencing). In another embodiment, notifications and alerts are used when a user's Telecommunication Device(s) have used a specified amount of airtime or bandwidth for a given period, or if the user's Telecommunication Device transitions from a roaming to non-roaming state or vise-versa. Additionally, this invention enables an alert when Telecommunication Call Events are made to a particular Telecommunication Device to notify a specific user or group of users that an action is required which is related to the user initiating the Telecommunication Call Events and/or to the user of said Telecommunication Device. In one embodiment, this alert can illustrate that a sales deal has been closed or moved to a different deal-stage. This invention allows alerts to be sent using various different communication methods, such as, and without limitation: E-Mail, SMS Messages, Instant Message, Telephone Call, Page, or the like.

It is an object of the present invention to provide a method and system that provides the capability to access or download related Telecommunication Call Events and/or their associated database records to a computer device in both processed and raw formats. In one embodiment, a user is allowed to download Telecommunication Call Events in a comma delimited format (i.e., .CSV format) for the purpose of integrating said information into a spreadsheet for the tabulation of various fields that are not typically exposed through an online website report. This provides the user with ultimate flexibility in viewing the Telecommunication Call Events, such as the total call duration for a specified range of time. In another embodiment, downloading the Telecommunication Call Events and their associated database records enable the updating of Personal Information Management (PIM) applications, such as updating Contacts, Journals, Calendar Events, Tasks, or the like.

It is an object of the present invention to provide a method and system that provides the capability for the Telecommunication Device running an application to perform searches which can be transferred or synchronized to an online server system for later retrieval via the online server system, remote computer, or on the Telecommunication Device. It is an additional object of this invention to allow the searches to be performed on a remote computer that interfaces with the online server system and allows searches to be cached on the online server system which are later synchronized or transferred to the Telecommunication Device or remote computer. It is a further object of this present invention to allow the searches to include spatial related searches, such as Yellow Pages or White Pages searches, or POI searches for creating Routes on the phone, in order to allow the application running on the Telecommunication Device or remote computing device to transfer the searched places to the online server system or remote computer.

For example, in one embodiment, a user that is authenticated and authorized by an application running on a wireless telephone is able to access the Internet and search for a Point of Interest (POI) or Place (e.g., such as a restaurant, airport, or the like). Those searched Places are then transferred to an online server system. When the user is authenticated and authorized via a web browser on a different computing device that has access to said online server system, the user is then able to retrieve and access the Places that were recently searched for on the user's wireless telephone. Additionally, from the web browser, the user is able to save the Place information into their own personal database and add additional objects of information, such as text notes, documents, articles, or the like, about the Place. It would be appreciated by those skilled in the art that searches performed on the Telecommunication Device are transferred to a remote database for future retrieval from disparate computing devices that have access to an online server system that stores the data records.

It is an object of the present invention to provide a method and system that provides the capability for searching Places (i.e., POIs), saving Places, creating Routes/Directions, and saving Routes/Directions using a computing platform, which may include a Telecommunication Device, that is connected to an online server system, and then accessing said saved or searched Places, or saved or searched Routes/Directions from a Telecommunication Device. It is an additional object of this invention to allow the accessed Places and/or Route/Direction information to be integrated and associated with the Telecommunication Device's specific interfaces, such as GPS, Address Book, Voice Recorder, Camera, Phone Capability, SMS, or the like. The associated data (e.g., Place and its associated Camera Image(s), Route and its associated Camera Image(s), etc.) derived from the Telecommunication Device's specific interfaces can then be transferred or synchronized to the online server system or remote computer. After the synchronization or transfer process, the recently searched Place and/or Route/Direction information that is stored on the online server system now has additional database records (i.e., Camera Images, etc.) that were derived from the Telecommunication Device associated with the Place and/or Route/Direction information.

It is an additional object of this invention to allow a Telecommunication Device to generate real-time maps based on retrieved Places' address information which was searched or saved on the online server system. It is an additional object of this invention to modify driving directions in real-time, while using a Telecommunication Device, which are based on driving directions that were searched or saved on the online server system. It is an additional object of this invention to create new driving directions in real-time, while using a Telecommunication Device, which are based on Places that were searched or saved on the online server system. In one embodiment, a user that has a dentist appointment in an hour first signs in to a web page by entering a username and password. The user searches for the dentist using the web browser that is connected to an online server system that has access to Places (i.e., POIs, Yellow Pages, White Pages, etc.) information. By noting the general location and area of the dentist office and without saving the Place (i.e., the dentist office), the user takes their wireless telephone with them and drives to the dentist office. During the trip to the dentist office the user gets lost and needs to find his way to the location of the dentist office.

The user signs in to an application that is running on the wireless phone and retrieves his recently searched Places that were searched for on the web. The user is then able to quickly map the dentist office (i.e., the Place) and even directly call the dentist office (i.e., since the Place information contains the phone number of the dentist), in the event that he might be late for his appointment. The user can do all this from his wireless telephone without having to perform a new search on the phone or call 411 to get the dentist office's phone number. Additionally this invention provides the user with the ability to dynamically create a route from their current location (i.e., route origin) to the dentist office (i.e., route destination) without having to enter in the destination address, which is very cumbersome on a wireless phone. In another embodiment, a user is able to retrieve a Place that was searched for and saved to the online server system from their wireless telephone by simple requesting recently saved Places by clicking on a menu option on their wireless telephone. After retrieving and selecting the desired Place the user is able to take a picture using the camera that is integrated into the wireless telephone, and then associate the picture with said Place on the wireless telephone application. Additionally, the application that is running on the user's wireless telephone will then transfer or synchronize the picture to the online server system so that when the user accesses the Place using a web browser on a laptop, the user will be able to see the picture that they took associated with the particular Place. Similarly, in another embodiment, the Place was not searched for on the web, but instead on the wireless phone. In a similar embodiment, a recently saved route was retrieved onto the wireless telephone and a set of pictures that were taken on the wireless phone were associated with the route and transferred or synchronized to the online server system for later viewing.

BRIEF DESCRIPTION OF THE DRAWINGS

FIG. 6 illustrates one embodiment of the Contacts home page in the website;

FIG. 7 illustrates one embodiment of a list of all Contacts, or a subset of all Contacts filtered by a given alphabetical letter, or numerically, or the like;

FIG. 9 illustrates one embodiment for displaying a page to edit all fields of a Contact's information;

FIG. 11 illustrates one embodiment for selecting a predefined date and time range for the purpose of generating various reports and also illustrates a list of phone statistics for a user and their team;

Figure 12:
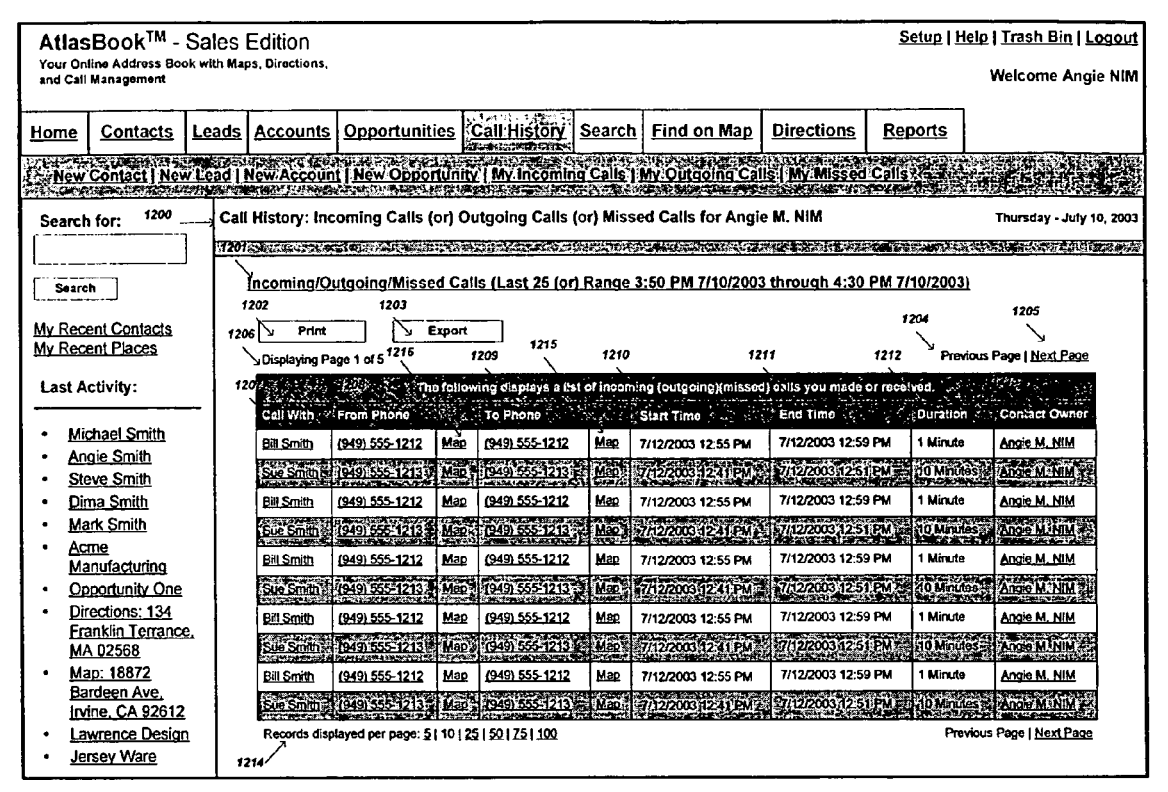

FIG. 12 illustrates one embodiment for viewing a list of incoming, outgoing, or missed calls and the ability to print or export the data related to said calls;

Figure 13:
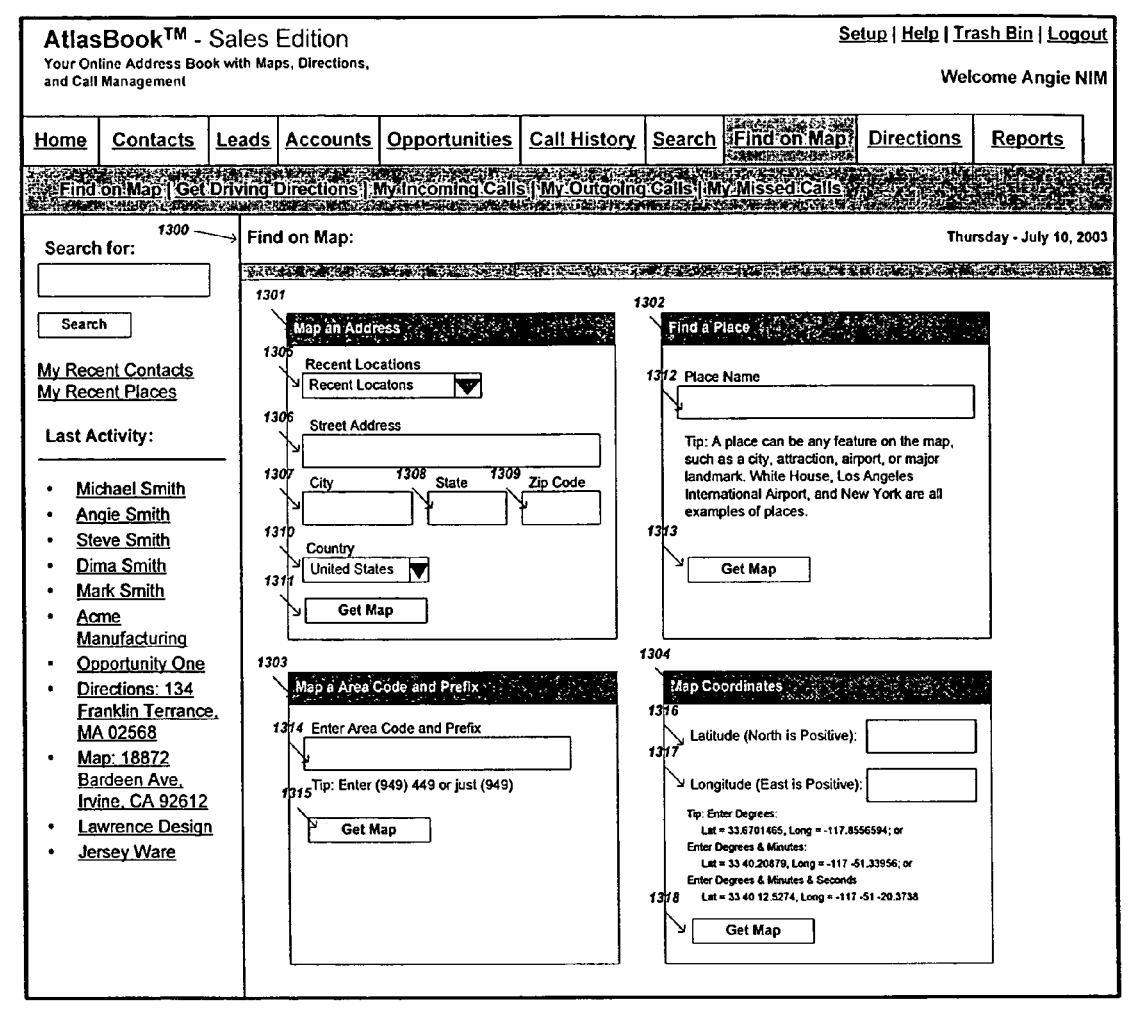

FIG. 13 illustrates one embodiment for finding various map related objects on a map, such as an address, a place (i.e., Point of Interest which is also known as a POI), an area code with or without prefix data, map coordinates, or the like;

FIG. 16 illustrates one embodiment for entering, or selecting, origin and destination addresses in order to plan and compute a route;

FIG. 19A illustrates one embodiment for displaying the personal information of a particular user;

FIG. 19C illustrates one embodiment for displaying the login history for a particular user;

FIG. 20 illustrates one embodiment for viewing and/or removing Telecommunication Devices that are associated and assigned to a particular user's account;

FIG. 21 illustrates one embodiment for associating a single or group of Telecommunication Devices to a particular user's account;

FIG. 23 illustrates one embodiment for displaying to a user a summary of the user's team members in an organization and their respective top-level account information and settings;

FIG. 24 illustrates one embodiment for changing the password policies for a particular user;

FIG. 25 illustrates one embodiment for displaying the total disk usage, such as that used for contact information, for an organization and for each individual user in the organization;

DETAILED DESCRIPTION OF THE EMBODIMENTS

The present invention provides a method and system for capturing, processing, mapping, reporting, and/or displaying Telecommunication Call Events that occur on either landline or wireless Telecommunication Devices (i.e., POTS telephones, cellular telephones, 3G-based wireless data/telephones, etc.), by which the information content of said Telecommunication Call Events can be presented locally on the Telecommunication Device or remotely on a desktop or laptop computer using a computer application or a web browser that can interface to an online networked server. This invention also provides for the synchronization or transfer of said Telecommunication Call Events either locally or remotely to another computing platform. This invention also provides the ability to associate said Telecommunication Call Events with various database records for a multitude of purposes, such as matching Telecommunication Call Events with a Contact database. This invention also enables associating Telecommunication Call Events with Contacts and other threads, such as Accounts, Opportunities, Forecasts, Leads, Tasks, Documents, Cases, other events, or the like. This invention also provides alerts, exceptions, and notifications that are related to the Telecommunication Call Events and associated database records. The present invention may be embodied in an online and Telecommunication Device application, such as the "AtlasBook" application owned and licensed by Networks In Motion, Inc. of Irvine, Calif.

The preferred embodiments of the present invention will now be described in detail with references to FIGS. 1-30.

Figure 1:
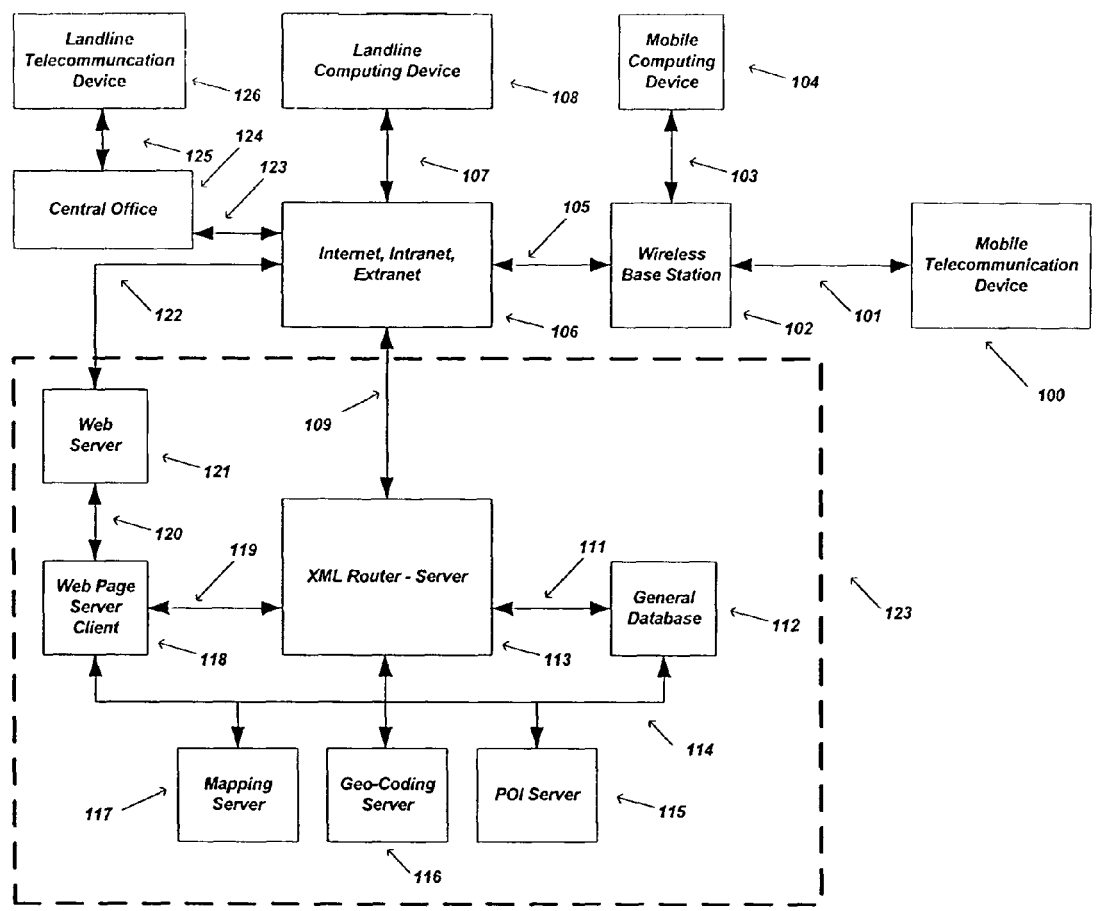
FIG. 1 illustrates a network system for providing a communication channel between various wireless and landline computing devices.
Figure 2:
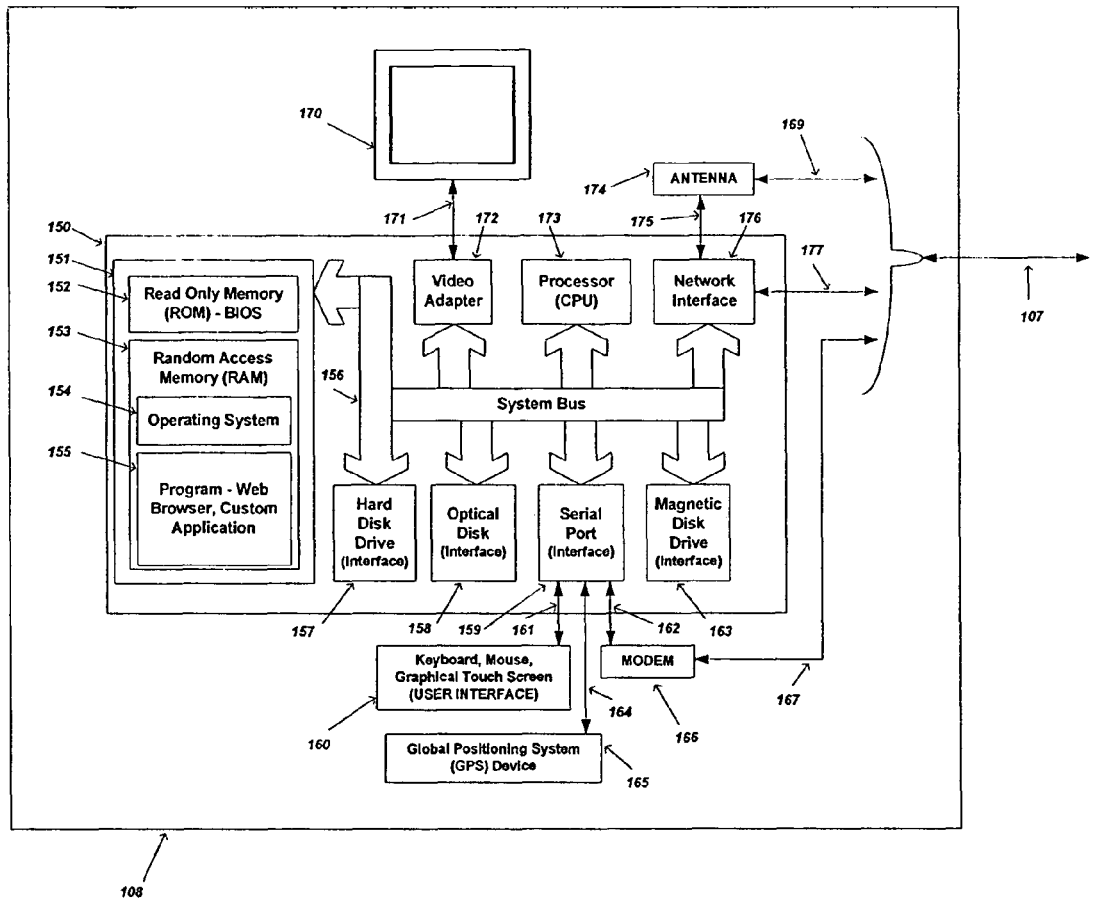
FIG. 2 illustrates one embodiment of the present invention showing a personal computer with an integrated web browser.

FIG. 1 and FIG. 2 illustrate high-level diagrams of a suitable computing and networking environment in which the various embodiments of the present invention may be implemented. The preferred embodiment of the present invention will be described in the general context of an application that executes on an operating system in conjunction with a personal computer or server, but those skilled in the art will realize that this invention may also be implemented in combination with other program modules. Program modules typically include routines, programs, data structures, etc. that perform particular tasks or implement particular abstract data types. This invention is not limited to a typical personal computer, but may also be utilized with other computing systems, such as handheld devices, mobile lap top computers, wireless phones, in-vehicle navigation systems, programmable consumer electronics, mainframe computers, distributed computer systems, etc., and the like.

FIG. 1 is a network block diagram illustrating the connection (125 & 101) of both wireless 100 and wired 126 Telecommunication devices to an Application Service Provider (ASP) 123, also referred to as an online server system. This online server system may be configured at a single location and on a single computer, or can be configured as a distributed computer system and at different locations. The wireless Mobile Telecommunication Devices 100 are wirelessly connected 101 to a nearby wireless base station 102, which are typically connected or have access to 105 the Internet, Intranet, or Extranet 106. Additionally, a landline Telecommunication Device 126 is typically connected to a nearby central office 124 which is connected or has access to 123 the Internet, Intranet, or Extranet 106. Additionally, the Application Service Provider (ASP) 123 also has access 109 to the Internet, Intranet, or Extranet 106. The ASP 123 generally consists of a front-end firewall and XML router 113 which itself has access (111 & 114 & 119) to other local computing modules, such as a database 112, POI server 115, geocoding server 116, mapping server 117, and webpage client server 118. The web-server front-end 118 can be connected to the outside Internet, Intranet, or Extranet 106 either through the local front-end firewall 113, or as in this embodiment, via 120 the web server 121, which is connected 122 directly to the Internet, Intranet, or Extranet 106 by using a software firewall which is well known to those skilled in the art. Additionally, either mobile 104 or landline 108 computing devices, such as a personal computer, are connected to the Internet, Intranet, or Extranet 106, either directly 107 or through a wireless connection 103 and base station 102.

FIG. 2 illustrates a typical personal computer 150, that includes a central processing unit (CPU) 173, video adapter 172, hard disk drive 157, optical disk 158, serial port 159, magnetic disk drive 163, system bus 156, and network interface 176→177 & 167 & 169→109. The hard disk drive 157 typically refers to a local non-volatile storage system for storing large amounts of data, such as a web browser program files or cookies or a user's Contact data. The optical disk 158 typically refers to a CD-ROM disk used for storing read-only data, such as an installation program. The serial port interface 159 is typically used to connect 161 the computer 150 to external devices 160, such as a keyboard, mouse, and graphical touch screen interface, and also can connect 164 to positioning devices 165, such as a GPS receiver. The keyboard and mouse 160, amongst other input devices 165, enable users to input information into the computer 150. The connection 161 & 164 cables can include a serial cable or universal serial bus (USB) cable. Other input devices, that are not shown, may include a joystick, scanner, camera, microphone, or the like. The magnetic disk drive 163 is typically used to store small amounts data, in comparison to a hard 157 or optical 158 disk drive, and typically lacks the data transfer rates of those other storage drives, but it enables both readable and writable capability.

The hard disk drive 157, optical disk drive 158, serial port interface 159, and magnetic disk drive 163 are all preferably connected to the main system bus 156 of the computer 150 for transferring data. A monitor 170 or other type of display device, such as a LCD display, is connected 171 to the computer system's 150 video adapter 172, which is connected to the system bus 156. Additional peripheral output devices, which are not included in this embodiment, such as a printer, speaker, etc., can also be connected to a personal computer 150. The system bus 156 also connects to the network interface 176, central processing unit (CPU) 173, and system memory 151. The system memory 151 contains both random access memory (RAM) 153, and read only memory (ROM) 152, that typically consists of the BIOS (Basic Input/Output System) of the computer, necessary for containing basic routines that enable the transfer of information between elements within the personal computer 150. The RAM 153 stores a number of program modules, such as the web browser and synchronization applications 155, and the Operating System 154 of the personal computing device 150 or personal computer 150. One example of such a program module 155 would be a web browser that is connected to the "AtlasBook" server that was previously mentioned.

Figure 3:
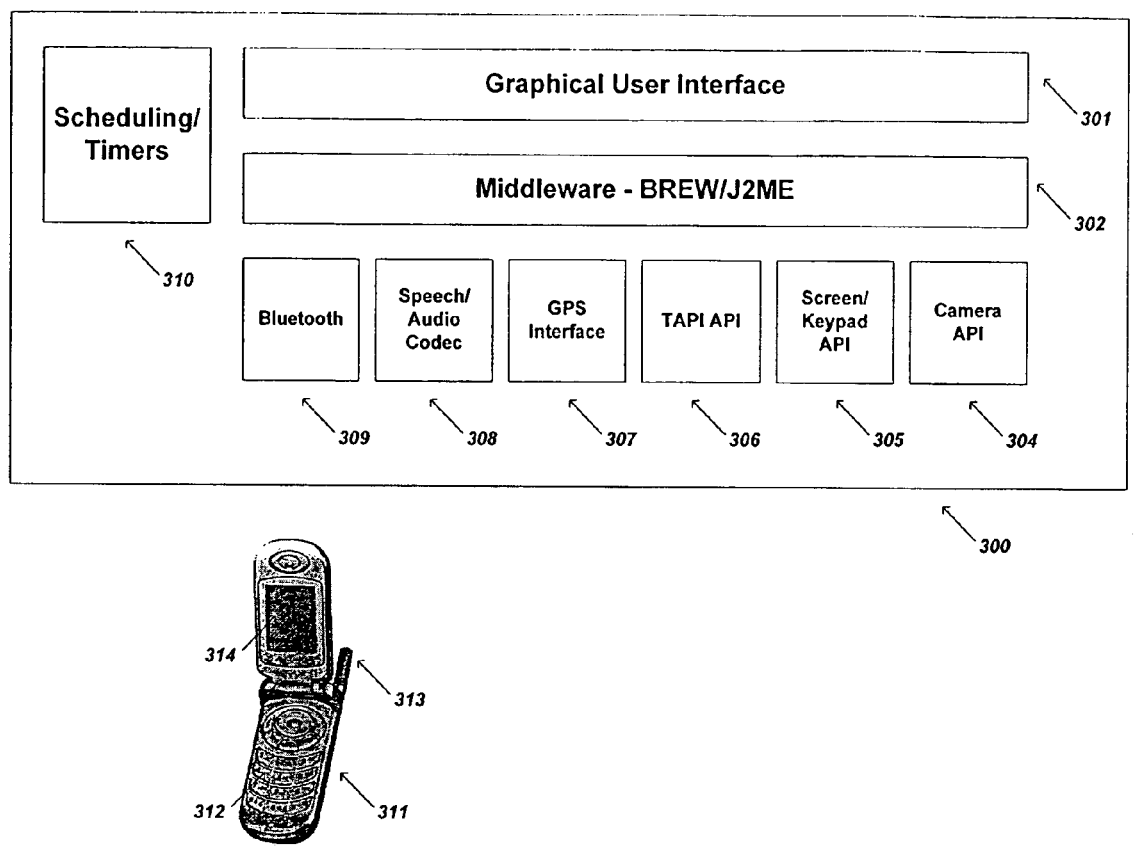
FIG. 3 illustrates one embodiment of the present invention of a wireless Telecommunication Device and an accompanying high-level block diagram of a wireless Telecommunication Device.

FIG. 3 illustrates a next generation wireless Telecommunication Device 311 in accordance with a preferred embodiment of the present invention, which preferably includes a display 314, an antenna 313, and a keypad 312. The next generation wireless Telecommunication Device 311 & 300, as illustrated in FIG. 3, provides a foundation 302 for running programs or applications that can access the Telecommunication Device's 311 internal interfaces, such as the Bluetooth 309, Speech/Audio Codec 308, GPS Interface 307, TAPI (Telephony Application Program Interface) 306 Interface, Screen/Keypad API (Application Program Interface) or Interface 305, Camera API 304, or the like as well known to those that are skilled in the art. As those that are skilled in the art will appreciate, a Telecommunication Device (300 & 311) will also include scheduling/timers 310 for scheduling specific events as is provided with standard computing platforms. Additionally, next generation Telecommunication Devices (300 & 311) have graphical user interfaces (GUI) 301 for applications to allow user input using a graphical display 314. As people skilled in the art will appreciate, these next generation Telecommunication Devices provide the means to access the Telecommunication Devices' internal APIs using a middleware 302 platform, such as J2ME or BREW, which are both well known to those skilled in the art. This simplifies the development process since there is significant support for obtaining developer's access to the Telecommunication Devices internal APIs, such as the TAPI interface for making telephone calls and capturing call logs.

Standard Telecommunication Devices provide an internal call logging capability, such as incoming call history 400, missed call history 401, and outgoing call history 402. Prior art solutions enabled the storage of vCard contact data on the Telecommunication Device, which is usually standard for wireless Telecommunication Devices. As those skilled in the art will appreciate, this invention provides the means to first run an application on the Telecommunication Device for the purpose of collecting Telecommunication Call Events, by using either Telecommunication Device timers 310, or by having the Telecommunication Device trigger the application when a particular Telecommunication Call Event occurs, such as when a telephone call is received, transmitted, or the like. As illustrated in FIG. 1, the wireless Telecommunication Device 100 is indirectly connected to the ASP server 123 preferably by means of the Internet, Intranet, or Extranet 106.

This provides a pathway for the synchronization or transfer of Telecommunication Call Events that are captured or recording on the Telecommunication Device to the ASP server 123. This transfer or synchronization process can occur in real-time or stored and then forwarded at a later time as previously mentioned in this invention.

Figure 4:
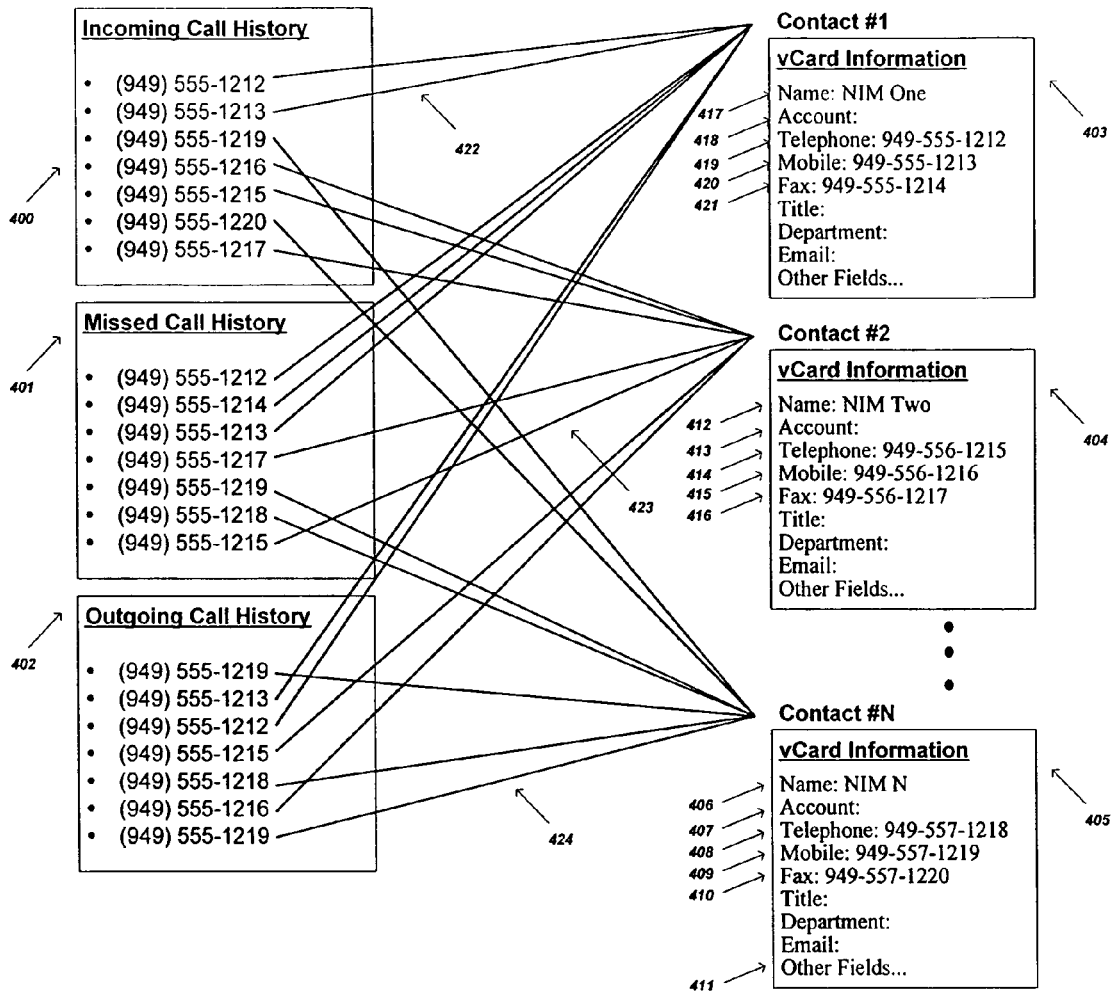
FIG. 4 illustrates one embodiment of linking Contacts in a database with synchronized call history or logged calls from a wireless Telecommunication Device.

Once the Telecommunication Call Events have been transferred to the ASP server 123, the ASP server 123 can then correlate said Telecommunication Call Events with Contact data that is also located on the ASP server 123 system. Using the Telecommunication Call Events history, it is possible to correlate said history with actual contact data that is stored in the ASP server 123 system. For example, in one embodiment, a user many have 1,000 Contacts' data (i.e., vCard data) stored on the online ASP 123 system. As illustrated in FIG. 4 Contact data consists of various user specific fields, including but not limited to the following:

Typical Contact (vCard) Data Fields: Title
First Name
Middle Name
Last Name
Suffix
Company
Department
Job Title
Business Street
Business Street 2
Business Street 3
Business City
Business State
Business Postal Code
Business Country
Business Latitude Business Longitude
Business Datum
Business Altitude
Business SIC Code
Home Street
Home Street 2
Home Street 3
Home City
Home State
Home Postal Code
Home Country
Home Latitude
Home Longitude
Home Datum
Home Altitude
Other Street
Other Street 2
Other Street 3
Other City
Other State
Other Postal Code
Other Country
Other Latitude
Other Longitude
Other Datum
Other Altitude
Assistant's Phone
Business Fax
Business Phone
Business Phone 2
Callback
Car Phone
Company Main Phone
Home Fax
Home Phone Home Phone 2
ISDN
Mobile Phone
Other Fax
Other Phone
Pager
Primary Phone
Radio Phone
TTY/TDD Phone
Telex
Account
Anniversary
Assistant's Name
Billing Information
Birthday
Business Address PO Box
Categories
Children
Directory Server
E-mail Address
E-mail Type
E-mail Display Name
E-mail 2 Address
E-mail 2 Type
E-mail 2 Display Name
E-mail 3 Address
E-mail 3 Type
E-mail 3 Display Name
Gender
Government ID Number
Hobby
Home Address PO Box
Initials
Internet Free Busy
Keywords
Language
Location
Manager's Name
Mileage
Notes
Office Location
Organizational ID Number
Other Address PO Box
Priority
Private
Profession
Referred By
Sensitivity
Spouse
User 1
User 2
User 3
User 4
Web Page It should be appreciated by those skilled in the art that Contact data has a plurality of telephone data, such as mobile, car, home, or the like, telephone fields in typical Contact data. As illustrated in FIG. 4 this Contact data may consist of Name (417 & 412 & 406), Account (418 & 413 & 407), Primary Telephone (419 & 414 & 408), Mobile Telephone (420 & 415 & 409), and Fax (421 & 416 & 410) fields, amongst other various fields 411 that were previous noted. Any given user can have a plurality of Contacts (403 & 404 & 405) that are associated with either a single user or group of users in an organization or across multiple organizations. This Contact Data can also embody Point of Interest (POI) records, such as waypoints, or the like, since a Contact Data record is very similar to a phonebook listing (i.e., White Pages or Yellow Pages). As those skilled in the art know, Contact Data, White Pages, and Yellow Pages records can be categorized together with very similar fields.

As further illustrated in FIG. 4, the preferred embodiment of the present invention provides the linking, either by implicit or explicit threads or links (422 & 423 & 424), between call history (400 & 401 & 402) and Contact Data (403 & 404 & 405). For example, an incoming call history telephone number (949-555-1213) can be linked or threaded 422 to a Contact 403 or group of Contacts, which may include POIs, or the like. Additionally, both missed call history 401 and outgoing call history 402 can also have threads or links (423 & 424) to various Contacts (404 & 405) or groups of Contacts.

Figure 5:
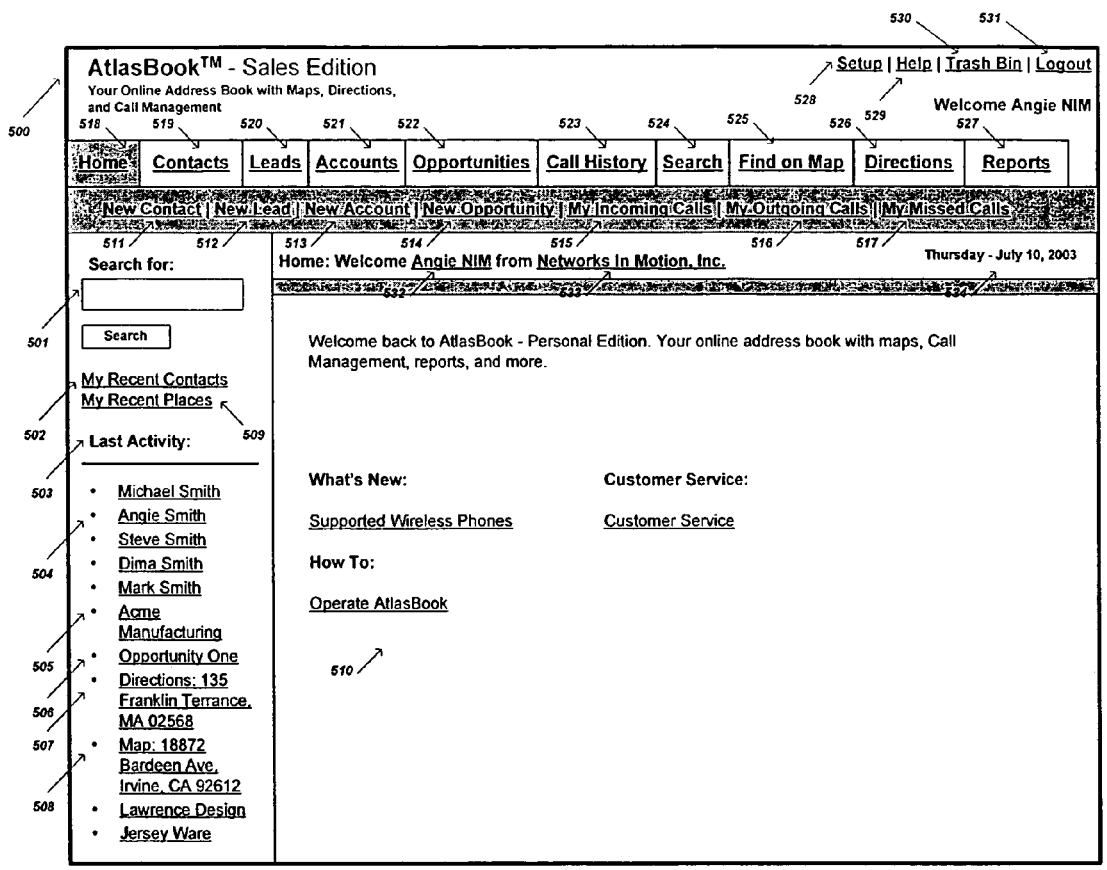
FIG. 5 illustrates one embodiment of the main sign-in page of an online website for accessing and managing Telecommunication Devices, Contact data, Accounts information, Account Opportunities, and other data and reports that typically relate to said data.

In the preferred embodiment, a Telecommunication Device runs or executes a program that collects and transfers Telecommunication Call Events in real-time, on schedule, at predefined intervals, or the like, for the purpose of processing the data, in this embodiment, at the ASP server 123 system. This unique approach enables the ability to provide a mechanism on the ASP server 123 system to display said Telecommunication Call Events in a plurality of methods. FIG. 5 illustrates such a mechanism as the main home page 510 of a website after a user has been authenticated and authorized by the system. The web page 500 of the ASP server 123 system displays a row of headers, such as Home 518, Contacts 519, Leads 520, Accounts 521, Opportunities 522, Call History 523, Search 524, Find on Map 525, Directions 526, and Reports 527. Each main tab, such as Contacts 519, provides a submenu of information related to said tab subject or to the main essence of the application. For example, in this illustration the Contacts Tab 519 provides a submenu directly related to Contacts that allows a user to create a New Contact 511, New Lead 512, New Account 513, and New Opportunity 514. Also provided in the Contacts Tab's 519 submenu are functions that indirectly reference Contacts, such as allowing a user to view its Incoming Calls 515, Outgoing Calls 516, and Missed Calls 517.

This page also indicates the name of the user that is signed in to the website 532 and its organization 533, in addition to the current date 534. Additionally, each web page 500 provides common functions, such as by the Setup 528, Help 529, Trash Bin 530, and Logout 531 links to other web pages 500. Other common features include the Search field 501, My Recent Contacts 502, My Recent Places 509, and the Last Activity 503 consisting of the user's recent activity within the web page 500. The Last Activity 503 provides a cache of all recently accessed Contacts 504, Maps or Places 508, Routes 507, Opportunities 506, Leads, Accounts 505, Call History, or the like. My Recent Contacts 502 and My Recent Places 509 illustrate a more specific cache of only the recent contacts and places, respectively, that were searched. It should be appreciated by those that are skilled in the art, that if you search for a place on the ASP server 123 system, and it is displayed on the web page 500 in the My Recent Places 509 list, the same fields are accessible on a user's mobile device. For example, if a user searches for a Dentist office on the website it will be stored as a recent item in the user's My Recent Places 509 list. When that user is on the move, the user can access this location on its wireless telephone by simply searching its My Recent Places list. This part of the invention allows a user to easily and quickly mirror and retrieve the recent searches that the user performed on the web site 500 for fast retrieval on the mobile telephone.

As illustrated in FIG. 6, when you first visit the Contacts 519 web page 500, the information displayed is a table 611 that lists the contacts whose information was recently viewed on the web page 500. Some standard fields provided include Contact Name 608, Company 609, and Phone Number 610. This Recently Viewed 600 contact web page provides a quick glance at the most recently viewed contacts. Additionally, a user can request to view a list of their contacts unfiltered (i.e., "All Contacts" 601), or by other filters, such as "Recently Edited" 602, "My Recent Contacts" 603, "My Recent Places" 604, "Birthdays this Month" 605, Contacts "New Last Week" 606, and Contacts "New this Week" 607.

Figure 7:
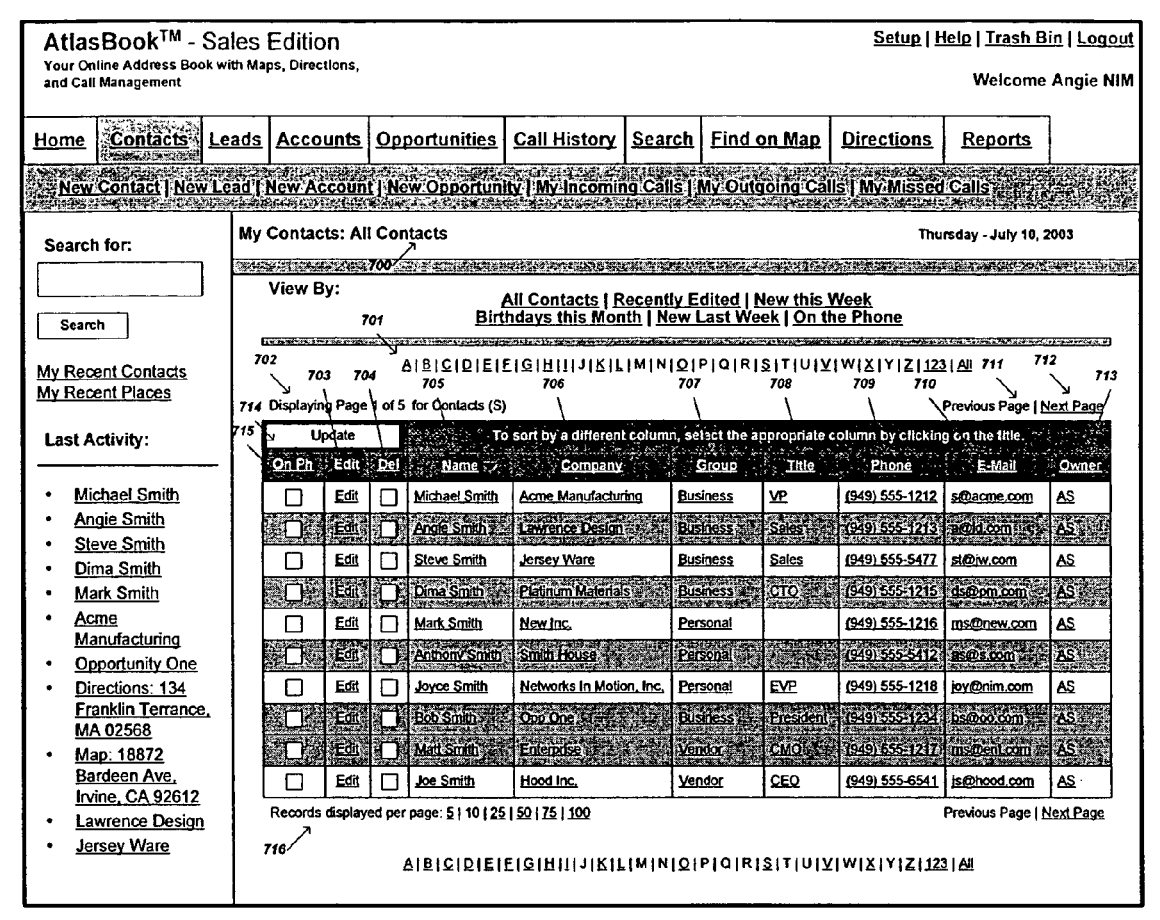

As illustrated in FIG. 7, the "All Contacts" view 700 provides a detailed view of all of a user's contacts. This view's 700 data can be sorted by a number of fields, such as Name 705, Company 706, Group 707, Title 708, Phone 709, E-Mail 710, or Owner 713. Contact data can be sorted and viewed 701 alphabetically (i.e., A-Z), numerically (i.e., "123"), or viewed in its entirety (i.e., "All"). Each displayed set of contact data is numbered 702 and displayed to the user, and a user may view the next 711 and previous 712 sets of contact data easily. Additionally, the number of contact data records displayed at a time (i.e., per set) is preferably configurable 716. As people skilled in the art will appreciate, a user can edit 703 any contact or delete a single or multiple contacts 704. A user can also select contacts to be downloaded to the Telecommunication Device by checking the check box for the On Ph (on the phone) 715 field and clicking the Update 714 button. This enables the wireless phone to download the selected Contacts to the Telecommunication Device's local address book. As people in the art will appreciate, the Contact data can be compressed for download, and each contact can be identified by a pre-defined ID in order to allow for differential updates of contacts that have changed since the last download.

Figure 8:
FIG. 8 illustrates one embodiment for displaying detailed Contact information for a particular Contact and the associated call history for said Contact.

Providing a full view of information about a particular Contact 800 is preferred in an address book application. FIG. 8 illustrates the main fields for providing said vCard fields. These fields include Name, Job Title, company Department, Birthday, Reports To, and Contact Source, as illustrated in one block of information 806. Another block of information 825 illustrates contact information, such as Work Phone, Work Fax, Mobile Phone, Home Phone, E-Mail Address, IM Address, and Web Page. Other information blocks include Contact Owner, vCard Group and Type 807, as well as information on the maintenance of the contact (i.e., Created By and Modified By) and its viewing Permissions 824.

Address information is provided in separate blocks of information, such as Home 823 and Work Address fields 808, which provides the ability to map the contact in the application. Other contact fields blocks include a block 809 with alternate email addresses (i.e., E-Mail 2, E-Mail 3) and Pager and Car Phone numbers, and a block 822 with the Home Fax number, Anniversary, Spouse, and Children information fields. A final block 810 is provided for the notes field. The summation of all of these individual blocks of information provides complete Contact (i.e., vCard) information for any contact. A user can also edit 801, copy 802, print 803, and delete 804 the contact. Finally, an image 826 associated with the Contact is displayed to the user alongside the other Contact data. This invention also allows a user to obtain driving directions 805 to and from the contact.

In accordance with the preferred embodiment, the Telecommunication Call Events made to the Telecommunication Devices associated with the signed-in user that were initiated or received by the viewed Contact are preferably displayed, as all of the Telecommunication Call Events that were captured for said user are stored on the online ASP 123 system. For example, in one embodiment as shown in FIG. 8, the call history 811 is provided for the user 800 that had calls with 812 various other Contacts, which may be the same said user or another user within the same team as said user. If a Contact name is provided, the Contact Owner field 820 is also displayed, since each contact belongs to someone (i.e., another user which is responsible for the maintenance of a contact). The call history 811 displays each call's "From Phone" 815 and "To Phone" 816 phone number identifiers, as well as the start 817 and end 818 time of the call and the call's duration 819. This list only provides a subset of the complete call history for this Contact 800, and the user can choose the length of this displayed subset by selecting the number of records displayed per page 813. To view the Contact's 800 complete call history, a user can click on a button 814 in the webpage. Additionally, a user can also send an e-mail to this contact by clicking a different button 821 in the web page.

Figure 9:
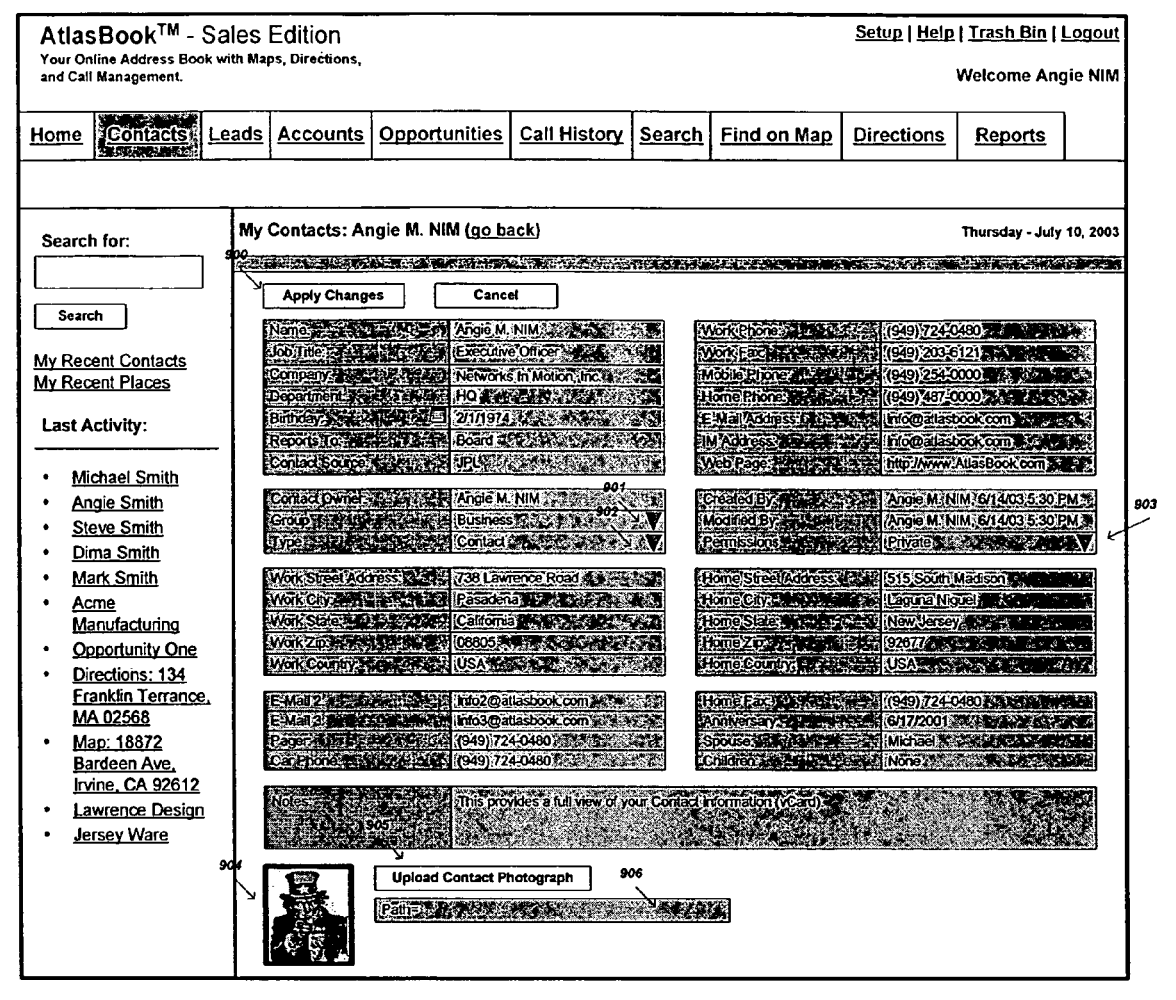

As illustrated in FIG. 9, preferably all of the contact fields can be edited, except the Created By and Modified By fields. Additionally in one embodiment, each contact can have different permissions 903 associated with it, since a contact can be shared by a group of users if it is a public contact. In one embodiment, each Contact can be placed in a folder or Group 901 and each Contact has an associated Type 902 that can be changed as shown below in the following tables.

| Type Fields |
| --- |
| Contacts |
| Places |
| Group Fields |
| Unfiled |
| Business (default) |
| Personal |
| Family |
| Friends |
| Colleagues |
| School |
| VIP |
| Favorites |
| Competition |
| Suppliers |
| International |
| Miscellaneous |

Furthermore, each Contact can have an image (826 & 904) associated with it, which is uploaded to the server by clicking on the "Upload Contact Photograph" 905 button. The Path 906 of the image 904 on the local machine is displayed to the user in the web page. When all changes save been made, a user clicks a button to apply changes 900 using a mouse in a web browser, which is known to all people that are skilled in the art.

Figure 10:
FIG. 10 illustrates one embodiment for creating a new Contact.

As illustrated in FIG. 10, it is possible to create a new Contact 1000 and enter in all of the available information fields for a Contact, except the Created By and Modified By fields.

Figure 11:
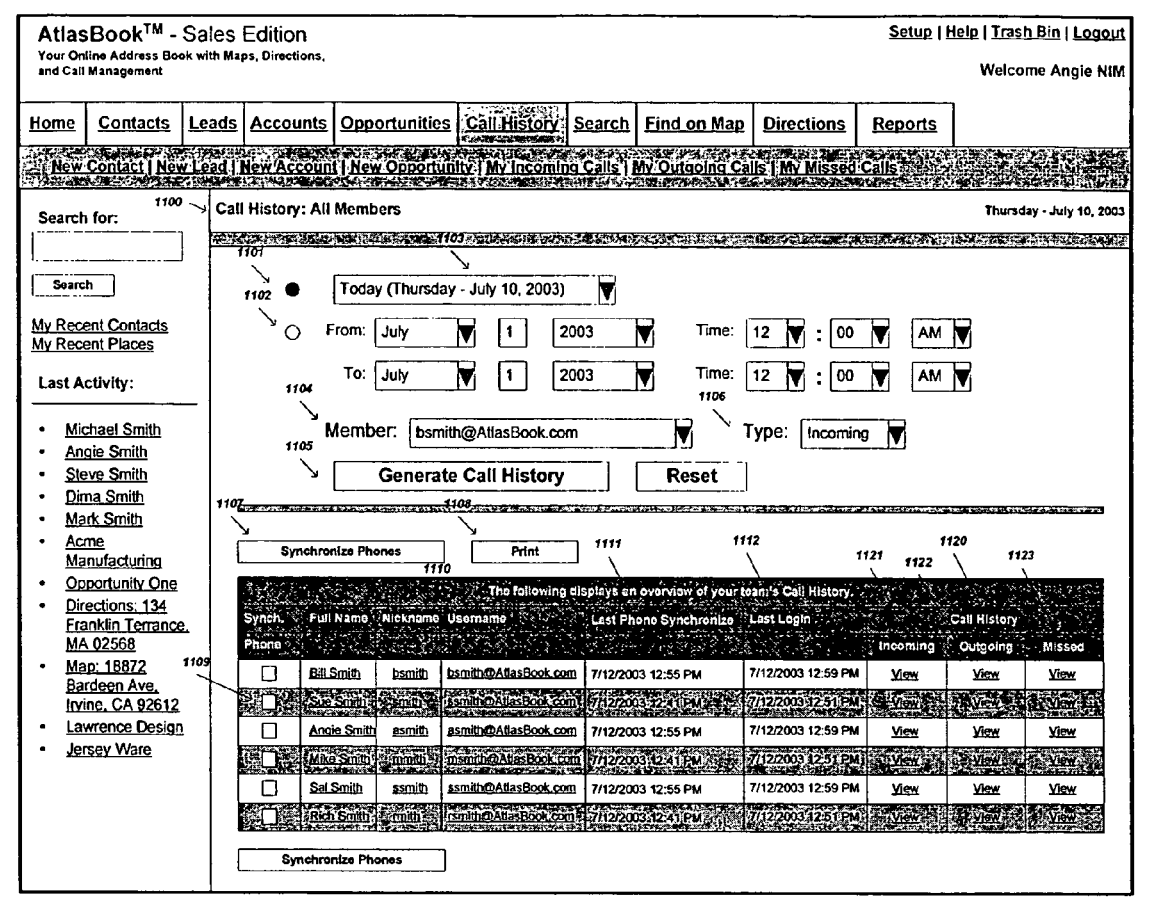

Searching for Call History 1100 for a team's members can be implemented using a date and time range. As illustrated in FIG. 11, a user can select either a predefined time range 1101, such as Today's date 1103 or can select from a group of time range identifiers 1102. For each search and in this preferred embodiment, a user is required to select the member or group of members 1104 and the type of call 1106, such as an incoming, outgoing, or missed call. In order to generate the call history view, after selecting the required fields, a user simply clicks on the generate button 1105.

Additionally, this call history view 1100 preferably displays an overview of a team's members 1110 and their phone statistics, such as Last Phone Synchronization time 1111 and Last Login 1112 either on the phone or the web site, and provides links to view the call history 1120 for incoming 1121, outgoing 1122, and missed 1123 calls. This view can also enable the remote synchronization of Telecommunication Call Events by checking a box 1109 and clicking the synchronize button 1107. The team's call history information can also be printed by clicking on a print button 1108.

When a Call History 1200 view is generated, it provides information illustrating the type of call history, such as incoming, outgoing, missed, or all calls 1201. The call history information identifies who the user had conversations with 1207 and can be generated for a plurality of Telecommunication Devices associated with the user's account. General call history information fields include "From Phone" 1208, "To Phone" 1209, "Start Time" 1210, "End Time" 1211, "Duration" 1212, and the "Contact Owner" 1213 of the contact if any exists. A link next to each phone number (both From and To) provides a way to Map (1215 & 1216) that phone number's location at the time the call was made or received or Map (1215 & 1216) the vCard's home or business address that is associated with said phone number. The number of call history records per page (1214 & 1206) can vary and previous 1204 or next 1205 page information can also be displayed. The entire or subset of said call history can be printed 1202 or exported 1203 by clicking the appropriate buttons on the web page.

The preferred embodiment of the present invention also includes a find on map 1300 functionality, which, in one embodiment, allows a user to search and map addresses 1301, places 1302, area code and prefix phone number information 1303, and latitude and longitude map coordinates 1304. Every time an address is searched for and found it is stored for future use by the Recent Locations 1305 feature on the web page. This allows a drop down menu for users to select from a number of recent pre-defined locations that were mapped on the web page. When entering an address, typically the fields required are a street address 1306, city 1307, state 1308, zip code 1309, and country 1310. After all or a subset of said information has been entered, a map can be generated by clicking on a button or link 1311 in this embodiment.

Figure 14:
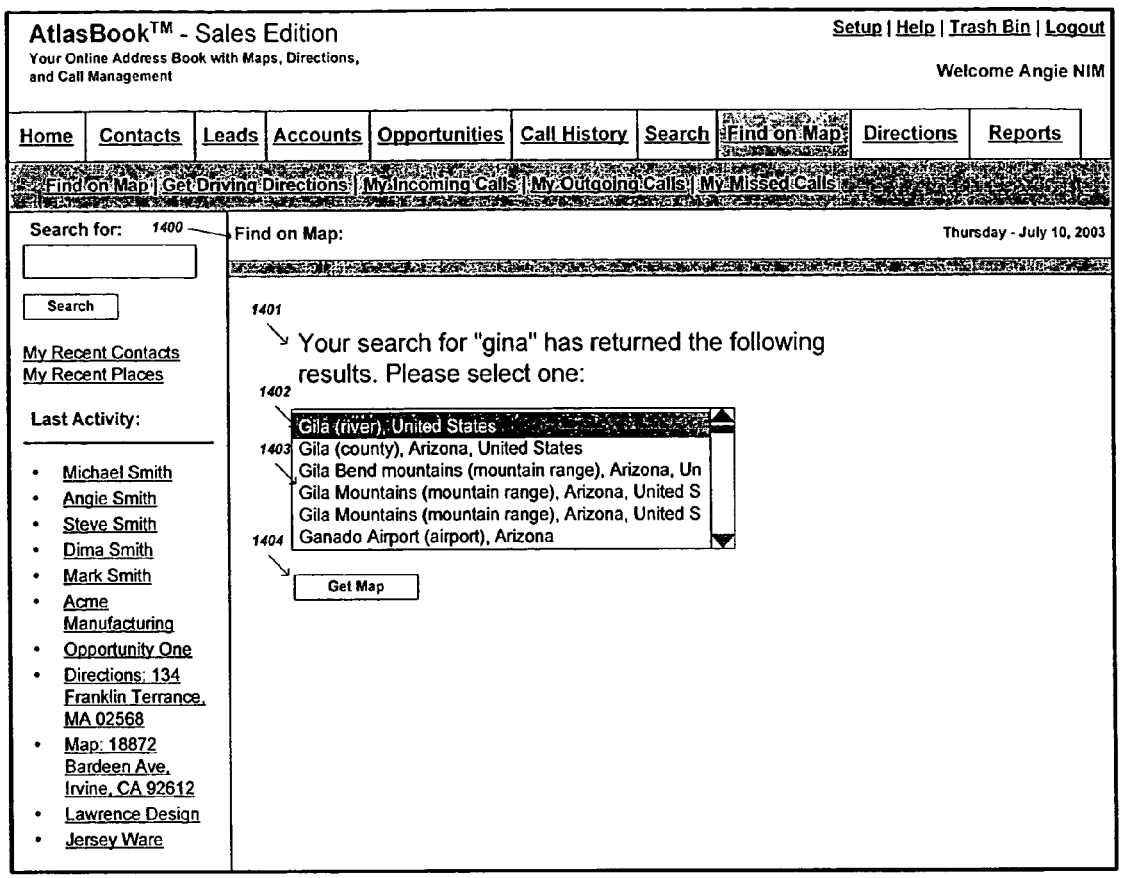
FIG. 14 illustrates one embodiment for displaying a list of partial matches for a searched place (i.e., POI)

Finding a place or POI 1302 is a similar process, but typically the only field that is required to be entered is the place name 1312 or description, such as the phone number, address, or the like as known to those that are skilled in the art. A map can be generated by clicking on a button or link 1313 in this embodiment. Additionally, a map of an area code and prefix 1303 can be obtained by entering said information 1314 and clicking on a button or link 1315 in this embodiment. In a similar manner, a user can enter latitude 1316 and longitude 1317 coordinates and click on a button or link 1318 in this embodiment to map the coordinates' location. For the case where a user entered a place name 1302 and requested a map 1313, if an exact match was not found a list of partial matches 1400 & 1401 is provided, as illustrated in FIG. 14. This partial list of information will highlight the closest matches 1402 and display a listing of the next immediate partial matches 1403. A user need only select a suitable match and click on a button or link 1404 to obtain a map in this embodiment.

Figure 15:
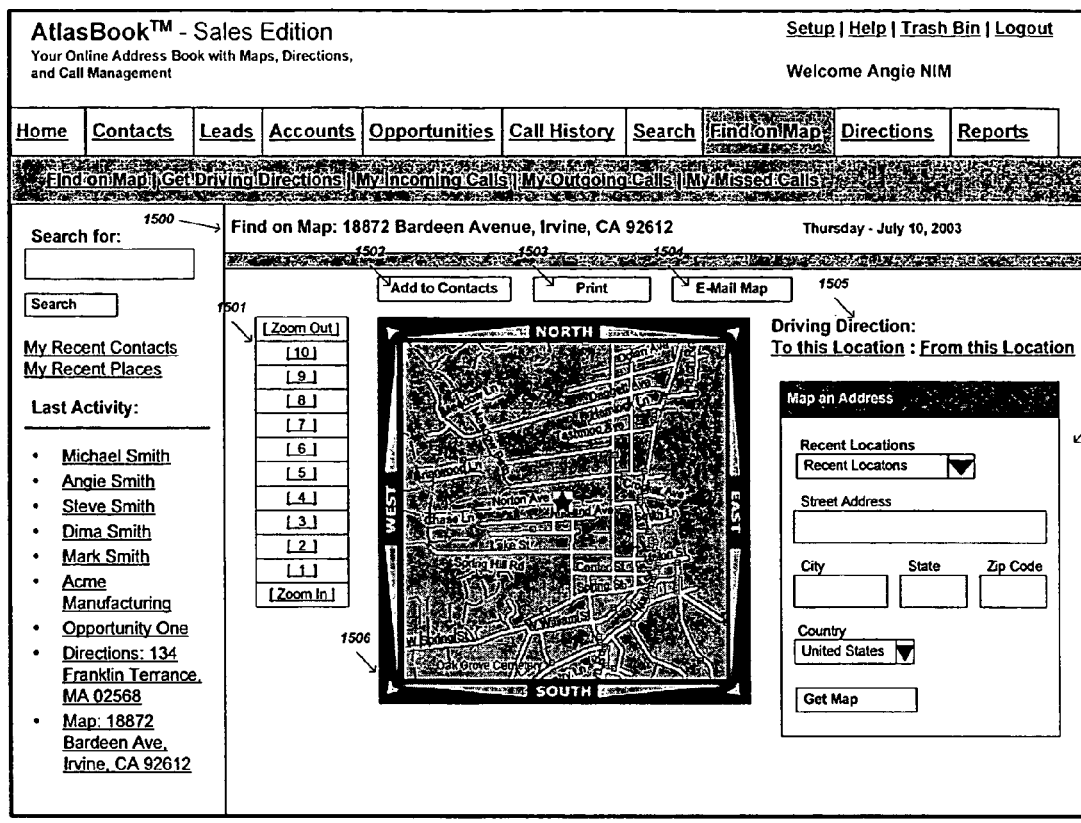
FIG. 15 illustrates one embodiment for displaying a map resulting from a found address, POI, area code/prefix location, or map coordinates and the ability to pan or zoom around on the map or add the mapped point to a planned route's destination or origin.

After a map has been obtained, as shown in FIG. 15, it will be displayed on a different web page 1500 illustrating the essence of the map 1506 and a mechanism to zoom 1501 and pan 1506 around the map. The panning 1506 is simply performed by clicking on the new center point of the map as known to people that are skilled in the art, or by selecting some other button in the direction of the desired pan. A user can add this mapped location to their Contacts 1502 or can print 1503 or E-Mail 1504 this map. Additionally, this location can be added to an origin or destination of a route for the purpose of creating driving directions 1505 to or from this location. At anytime a user can obtain a new map 1507 for another location.

As illustrated in FIG. 16, one embodiment of this invention allows a user to request driving directions 1600 from an entered starting address (i.e., origin) 1601 to an entered destination address 1604. A list of recent locations 1603 is available to the user in addition to the standard fields for mapping a location, such as the street address 1605, city 1606, state 1607 and zip code 1608. A user need only enter the required fields and may obtain a map by clicking on a button or link 1609 in this embodiment. After a successful search for the locations of the entered origin and destination addresses or selected locations is completed, a route is computed and driving directions are displayed in a new web page 1700. The resulting driving directions are summarized by displaying the start 1706 and end 1707 addresses, total trip driving distance, and total trip drive time 1710. Also provided is another opportunity to add the start 1706 or end 1707 address to the user's Contacts database by pressing a button next to the address (1708 & 1709). As another means of summarizing the route, a map of the destination location 1704 and a map of the entire route 1705 are displayed. Detailed driving directions 1711 are displayed in a list with route maneuver order numbers, maneuver instructions (i.e., "Turn Left on Jamboree Rd."), elapsed distance, and a graphical representation of the maneuver (i.e., left turn arrow). The driving directions view can be printed with the displayed maps 1702, without maps and just as text directions 1703, or can be emailed 1701.

Figure 18:
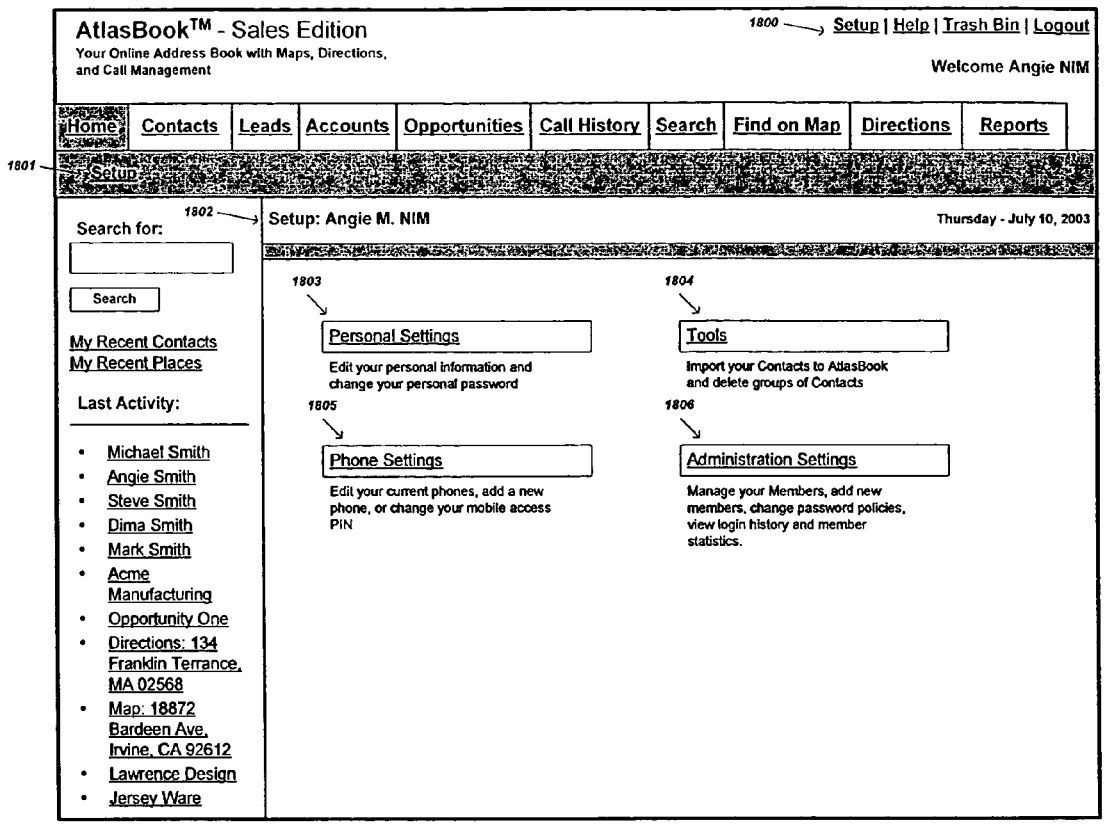
FIG. 18 illustrates one embodiment for displaying a particular user's account information.

FIG. 18 illustrates the setup view 1801 which offers options available to a user setting up its account, and displays the user's name 1802 that the options apply to. The setup view 1801 may offer options for the following settings: Personal Settings 1803, such as editing the user's personal information or password; Tools 1804, such as wizards for importing or deleting numerous Contacts; Phone Settings 1805, such as adding, editing or deleting phones associated with said user's account, or changing the user's mobile access PIN; and Administration Settings 1806 for authorized users, such as for managing the members of the user's team, changing password policies, and viewing login history and member statistics.

Figure 19A:
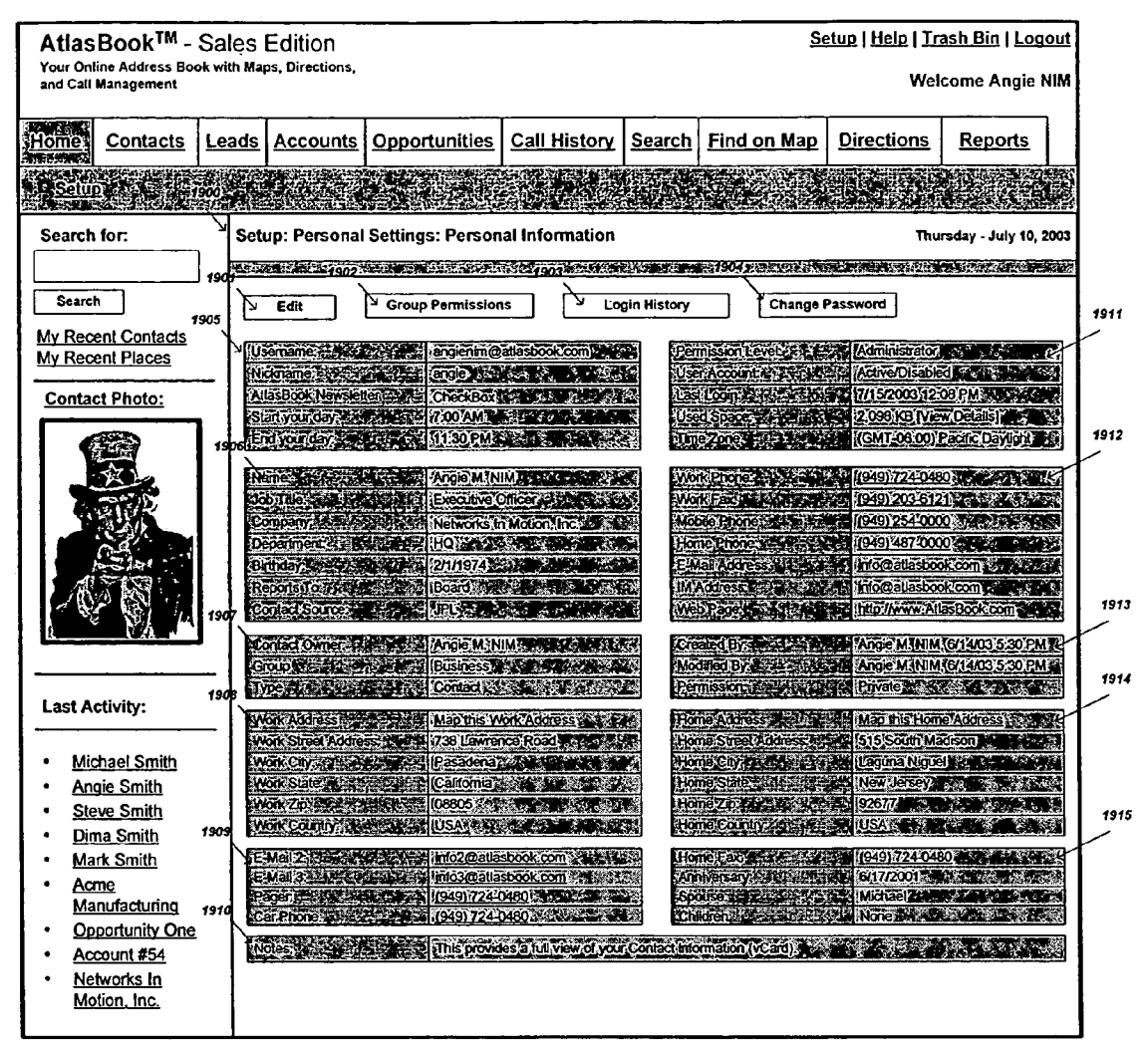

FIG. 19a illustrates the various fields associated with a user's Personal Information 1900, which is part of a user's Personal Settings 1803. The user's Personal Information 1900 fields are very similar to those of a Contact, since in a team this user can serve as a Contact and said user's Personal Information 1900 can serve as that Contact's information. Personal Information 1900 fields may include several blocks of information. For example, general account settings (1905 & 1911) may be described by username, nickname, permission level, user account status (active/disabled), last login date and time, disk space used by this account, user's time zone, user's preference for receiving the company's product newsletter, and the user's typical schedule for consideration in reports. More specific user identification information 1906 can be specified by name, job title, company, department, birthday, the direct supervisor of the user, and the source of this user's involvement with the team, if there is one. The user can then categorize its own Group and Type, being its own Contact Owner 1907, and the user can identify its contact information as private if necessary 1913. A user's contact information includes the usual address and phone number fields, such as Work 1908 and Home 1914 Street Address, City, State, Zip, and Country, Work and Home Phone and Fax, and Mobile Phone numbers (1912 & 1915). Other forms of contact, such as Email Addresses, IM Address, Web Page, Pager and Car Phone numbers (1912 & 1909) can also be included. For more personal notes, the user can enter information about their Anniversary, Spouse, and Children 1915, or miscellaneous information in the Notes field 1910.

Whenever a user's Personal Information 1900 is created or modified 1913, the time of that activity is recorded and also displayed along with the information. Once a user's Personal Information 1900 is recorded, the user can Edit 1901 its own personal information, view or modify its Group Permissions 1902, view its Login History 1903, or Change its Password 1904. From this detailed view of Personal Information 1900, a user can follow links provided to map the work or home address, to send an email to a clicked-on email address, to visit a clicked-on web page address (i.e., URL), or to view detailed call history for a clicked-on phone number.

Figure 19B:
FIG. 19B illustrates one embodiment for displaying the group permissions settings for a particular user.

FIG. 19b illustrates a sample list of Groups and their Permissions 1925, where each Group is identified by a pre-defined name 1926 and has a permission setting 1927. The permission setting 1927 determines if a Group, by which Contacts are grouped, is considered private or public. If a Group is made public, then all Contacts with that Group assignment are also made public and can be viewed in full detail by all team members. If a Group is made private, then all Contacts with that Group assignment are also made private and can be viewed in detail only by the Contact Owner.

Figure 19C:
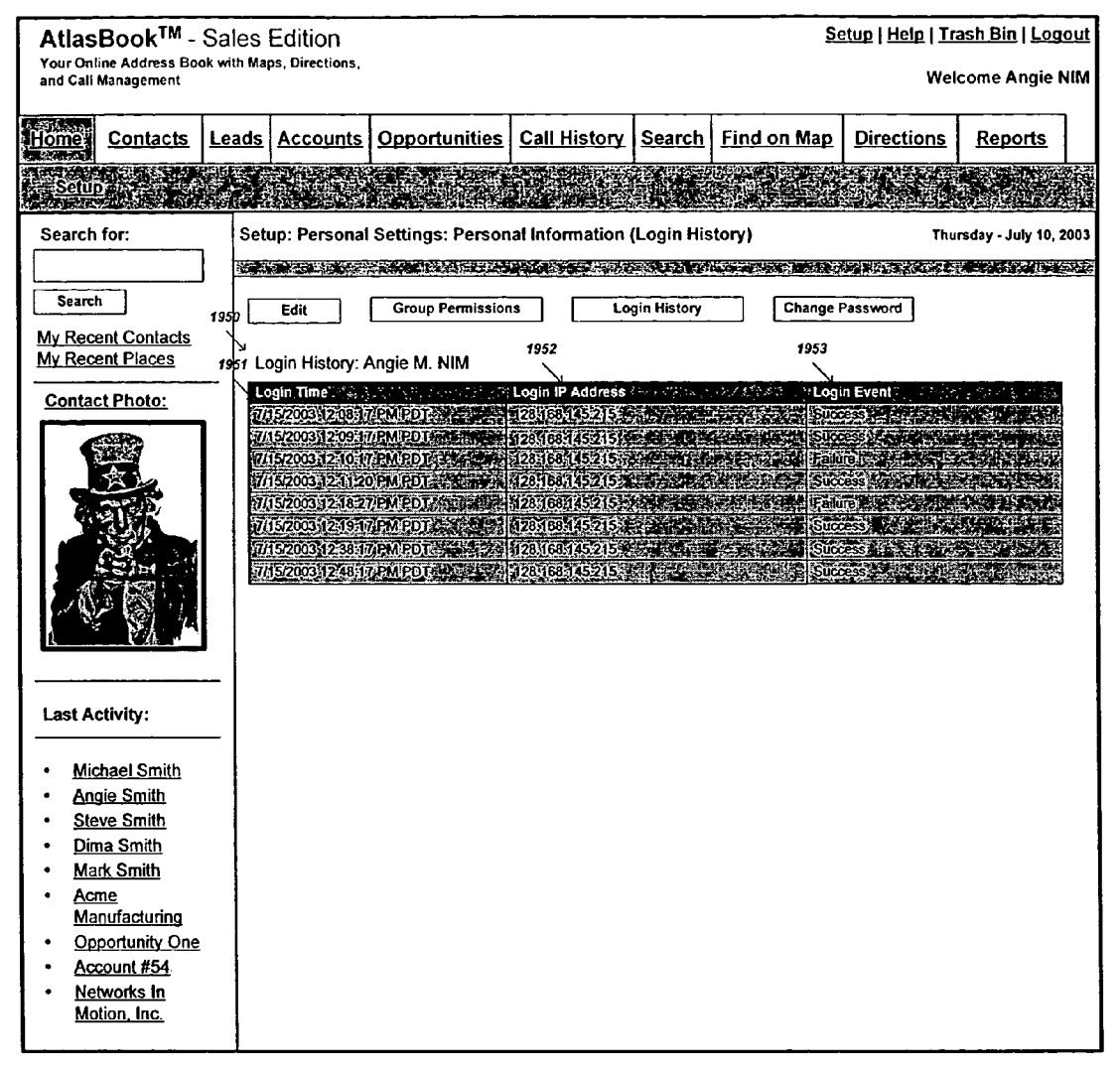

FIG. 19c illustrates an example of a user's login history 1950, where each login event is identified by the time the user signed in 1951, the IP Address the user logged in from 1952, and the result of the login attempt 1953, whether it succeeded or failed.

FIG. 20 illustrates an example of a user's phone assignments 2000, which is part of a user's Phone Settings 1805. All of the user's phone assignments, that is, those phones that are associated with said user's account, are listed 2001, and each phone assignment is described by its phone number and the time the phone was activated on said user's account. A phone number can be treated as a unique identifier, because, as previously described, a phone number can only be associated to one account, although an account may have multiple phone numbers associated with it. A phone assignment may be removed at anytime by clicking a Remove button next to the phone number to be removed.

Figure 21:
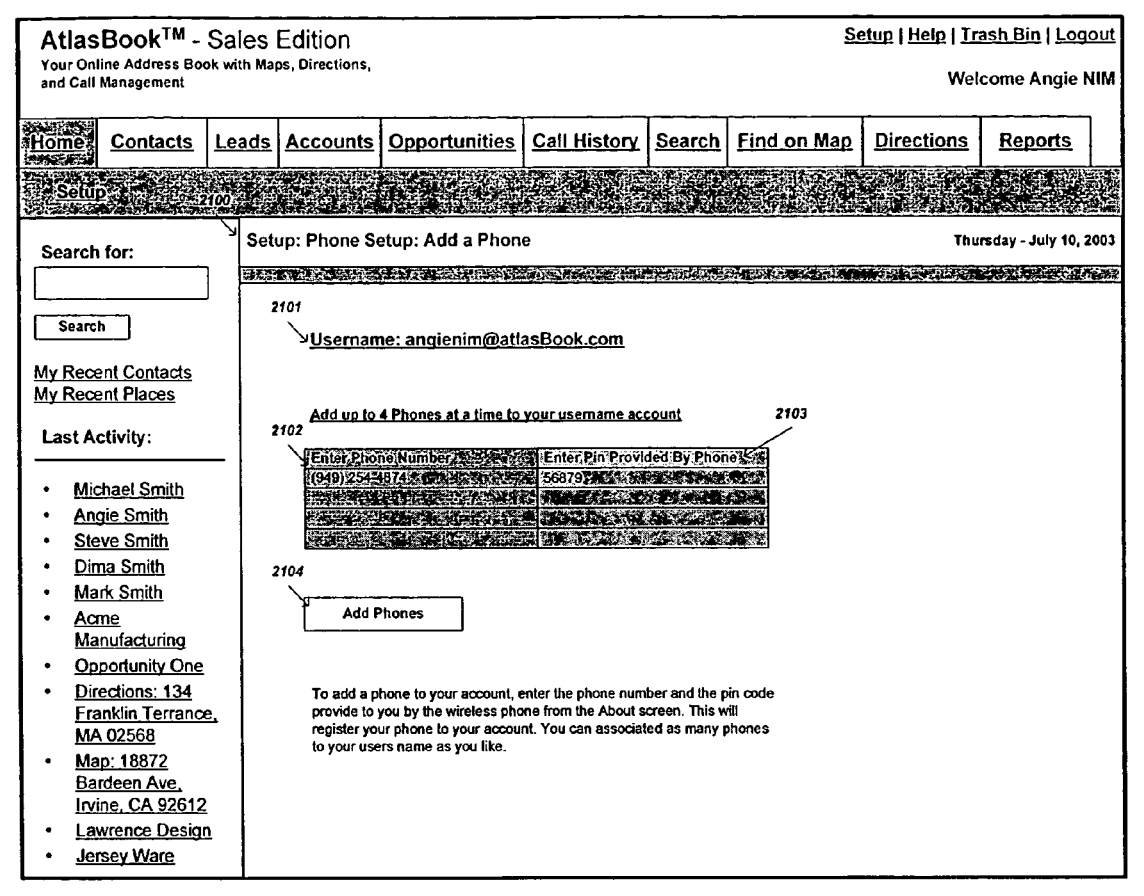

A phone assignment may also be easily added, as illustrated in FIG. 21. A user may add a phone 2100, which is part of a user's Phone Settings 1805, for its own account, of for another team member's account if the user has the appropriate permissions. The user whose account the phone assignment is being added to is identified by displaying that user's username 2601. In one embodiment, to add a phone assignment the user needs two pieces of information, the phone number 2102 and the phone's PIN 2103. The phone's PIN 2103 is obtained during the phone application's registration process, which requires communication with the server to allow the server to authorize registration, ensuring the phone number in question is not assigned to any other user accounts, and to allow the server to provide the phone application with a valid PIN. The phone's owner or user then uses that PIN on the web page to complete the process of associating that phone to the user's account. This ensures that the user requesting the phone addition has physical access to the phone, either directly or indirectly through a communicating phone user, and is thereby permitted to request the assignment. To complete the addition of a phone assignment, the user enters the required information and presses the Add Phones button 2104. Once the phone number is cleared for assignment and the PIN is verified, the new phone assignment is complete.

Figure 22:
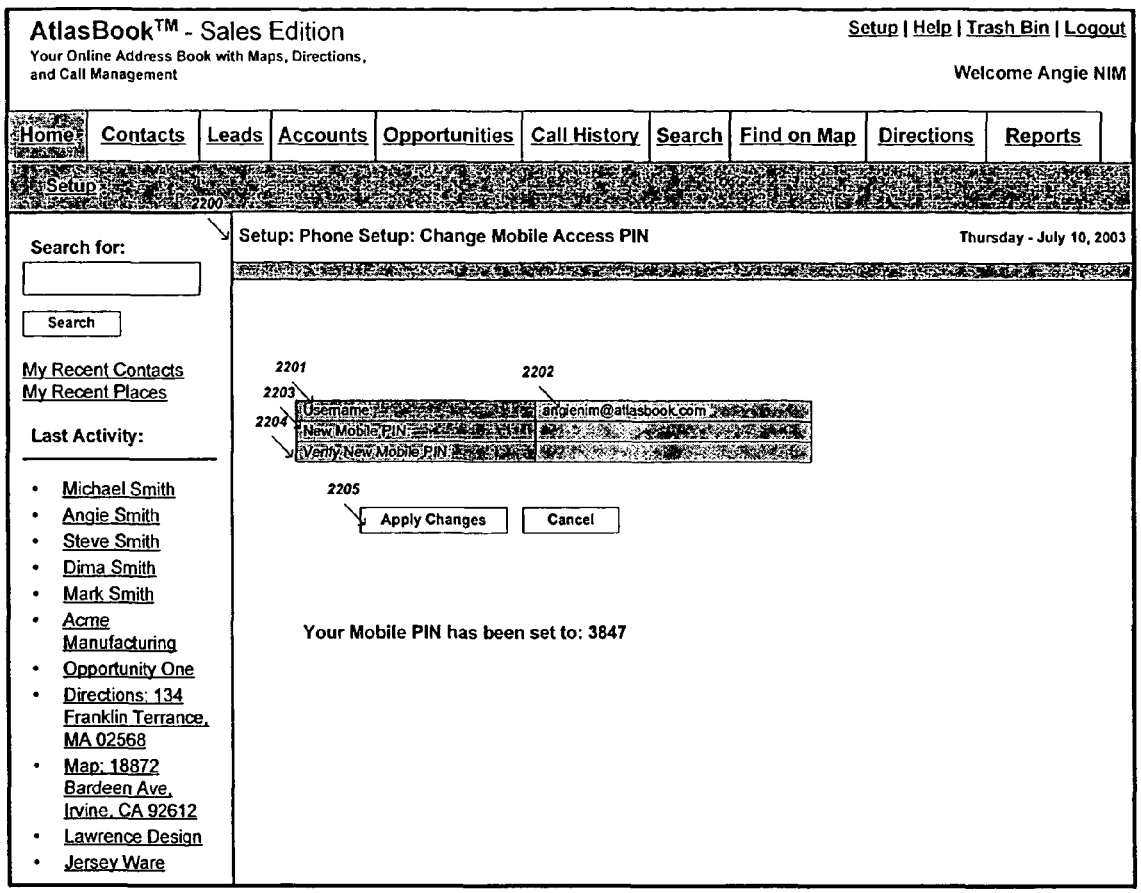
FIG. 22 illustrates one embodiment for changing the mobile access PIN for a user's Telecommunication Devices.

Another part of a user's Phone Settings 1805 is the ability to change the user's Mobile Access PIN 2200, as illustrated in FIG. 22. The Mobile Access PIN is the password used on the phone's application to access the user's account features, such as Contacts, My Recent Places, etc. The username 2201 for the user whose Mobile Access PIN will be changed is specified 2202, since users with appropriate permissions can also change another user's Mobile Access PIN. This may be useful, for example, when an employee leaves a company and the supervisor wants to ensure that the ex-employee can not access his/her old account anymore. To set a new Mobile Access PIN, the user enters the new Mobile Access PIN 2203 and confirms the entry by typing it in again 2204, and then presses the Apply Changes button 2205 to complete the change.

Figure 23:
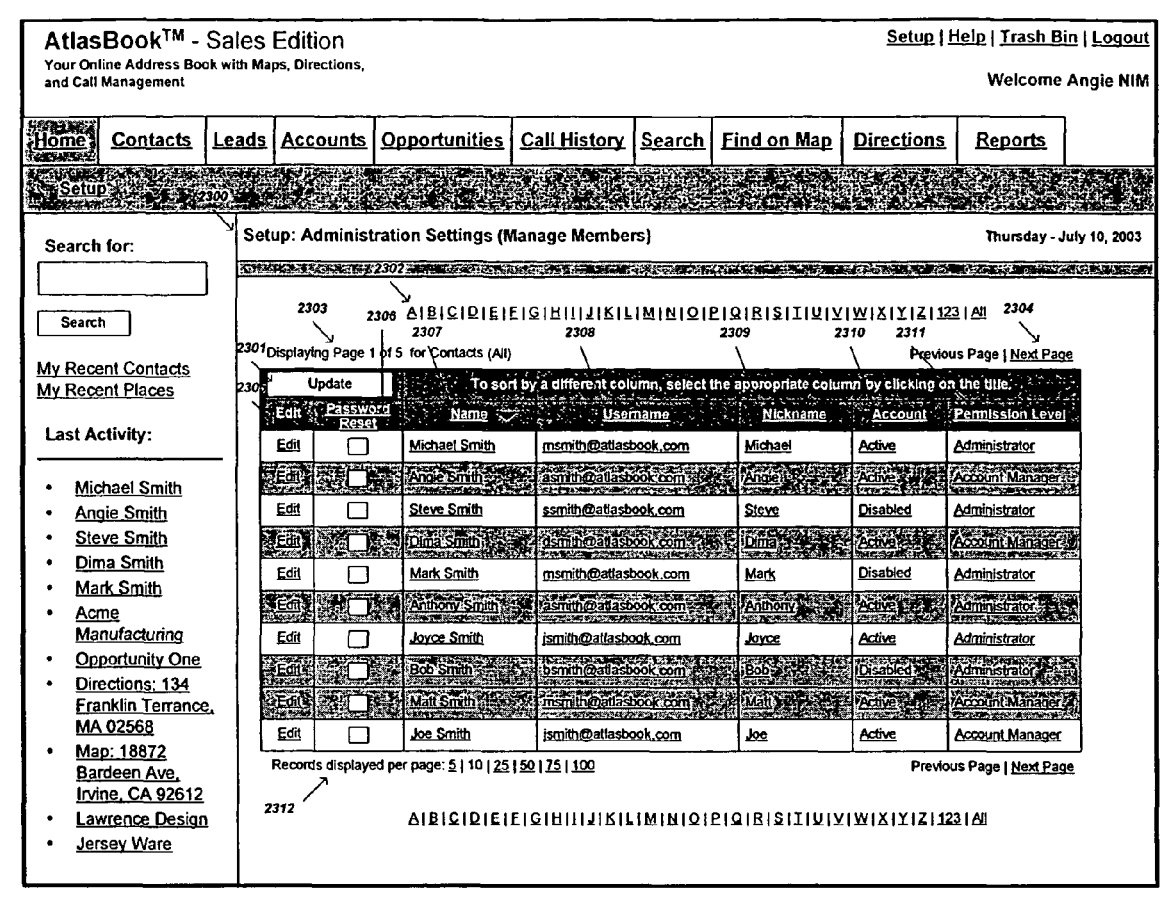

For use by teams, a team administrator should preferably be able to quickly view and modify the teams account settings. FIG. 23 illustrates the Administration Settings 2300 that a team administrator can use to manage the team's members. A team administrator can get a quick overview of the team in a tabular format, such as that illustrated, which summarizes each team member's name 2307, username 2308, nickname 2309, account status (active or disabled) 2310, and permission level 2311. Each member's information can be edited, simply by clicking on the Edit link 2305 next to the member's name, or by clicking on the links on the member's name 2307, username 2308, and nickname 2309. Multiple members' password can be reset by the administrator by checking the Password Reset checkbox 2306 next to each member whose password should be reset and pressing the Update button 2301. This overview of the team's member can be sorted, by clicking on any of the column headers, such as Name 2307, and can also be sorted by a specific letter or numerically 2302. The number of team members to display per web page 2312 may be selectable and the page number currently being viewed 2303 is also displayed. An administrator can move from page to page using Previous Page and Next Page links 2304. Clicking on a user's account status link 2310 will allow the administrator to change that user's account status from Active to Disabled or Disabled to Active. Clicking on a user's Permission Level link 2311 will allow the user to change that user's permission level, giving them more or less account privileges that their current settings provide. For example, a user who has Permission Level Account Manager can be made into an Administrator in order to increase that user's access and/or control over more of the team's functions and settings. Likewise, a user may be given a lower Permission Level in order to restrict that user's access and/or control more over the team's and/or user account's functions and settings.

Figure 24:
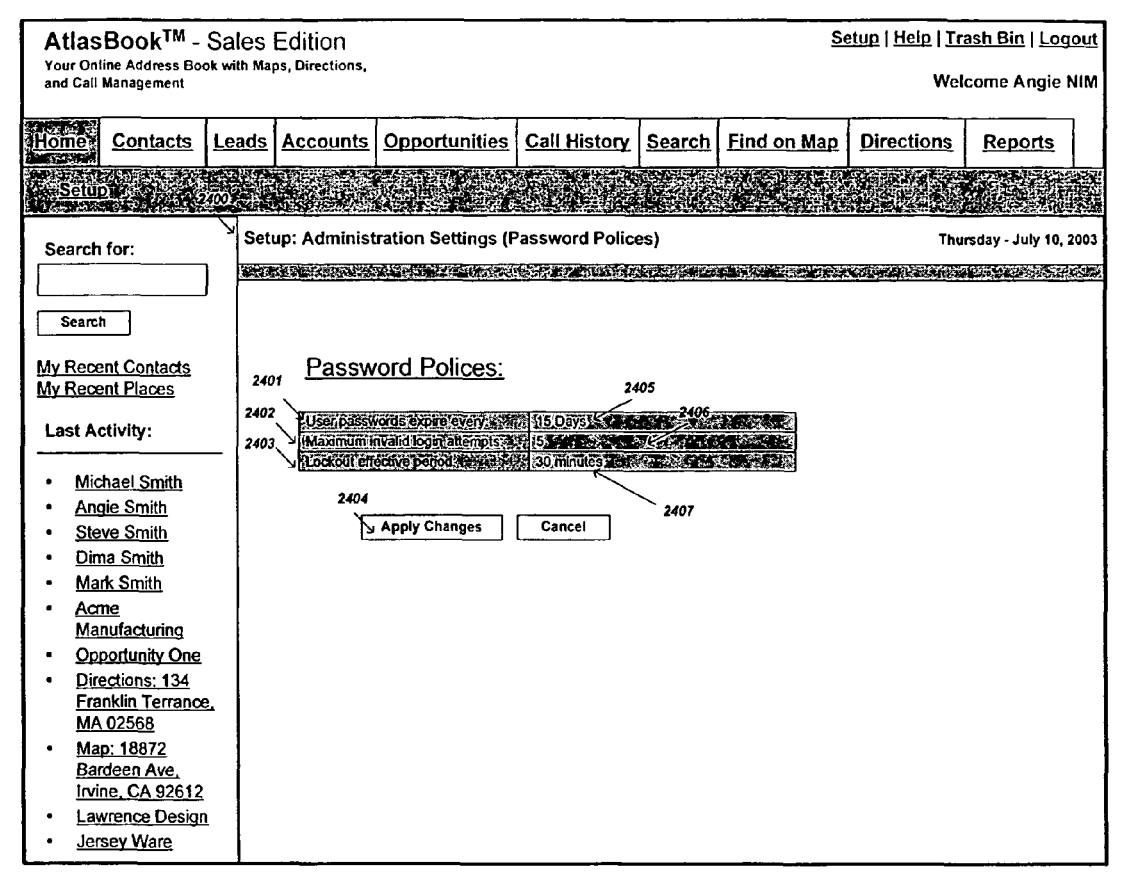

FIG. 24 illustrates an additional safety feature that helps administrator ensure their users' account information is accessed only by those users. Another part of Administration Settings 2300, Password Policies 2400 allow an administrator to require that all team members reset their passwords routinely in order to keep passwords secure and less prone to hacking 2401. To do this, an administrator simply specifies an expiration period 2405, after which the team's current passwords expire. To ward off hacker attempts, the administrator can set the maximum number of failed login attempts 2402 before a login attempt is no longer allowed. This too is a setting that can be changed simply by editing the current value displayed 2406. Once the maximum number of failed login attempts 2402 has been reached, the user attempting to login is "locked out" for a pre-defined period of time 2403. This lockout effective period 2403 can be adjusted from its current value simply by changing the period value 2407. Any changes made to any of the Password Policies values can be applied by pressing the Apply Changes button 2404.

Another part of Administrator Settings 2300 is being able to view Member Statistics 2500, as illustrated in FIG. 25. The administrator can get an at-a-glance overview of the team's usage of the application and the website and the amount of storage space currently used. This overview summarizes the whole team's statistics, such as by displaying the total number of contacts created by the team 2501 or the total amount of disk space used by the team 2502. The overview also summarizes each member's statistics in a tabular format, where the members can be viewed alphabetically, by a particular letter, or numerically 2503. Each team member in the overview is identified by its name 2505 and username 2506, and the member's displayed statistics include the number of contacts created 2507, the number of contacts synchronized to the phone 2508, and the amount of disk space used by that team member's account 2509. Clicking on any of the column headers sorts the overview list according to the clicked column data type. Clicking on the links where the data values are, such as on the team member's name or username, will link to more information on that user in reference to the data type clicked. Multiple web pages of members may be necessary, depending on the number of members the administrator chooses to display per page 2511, and the administrator can scroll to the next and previous pages using a link 2510, while the currently viewed page is numbered and displayed 2504.

Figure 26:
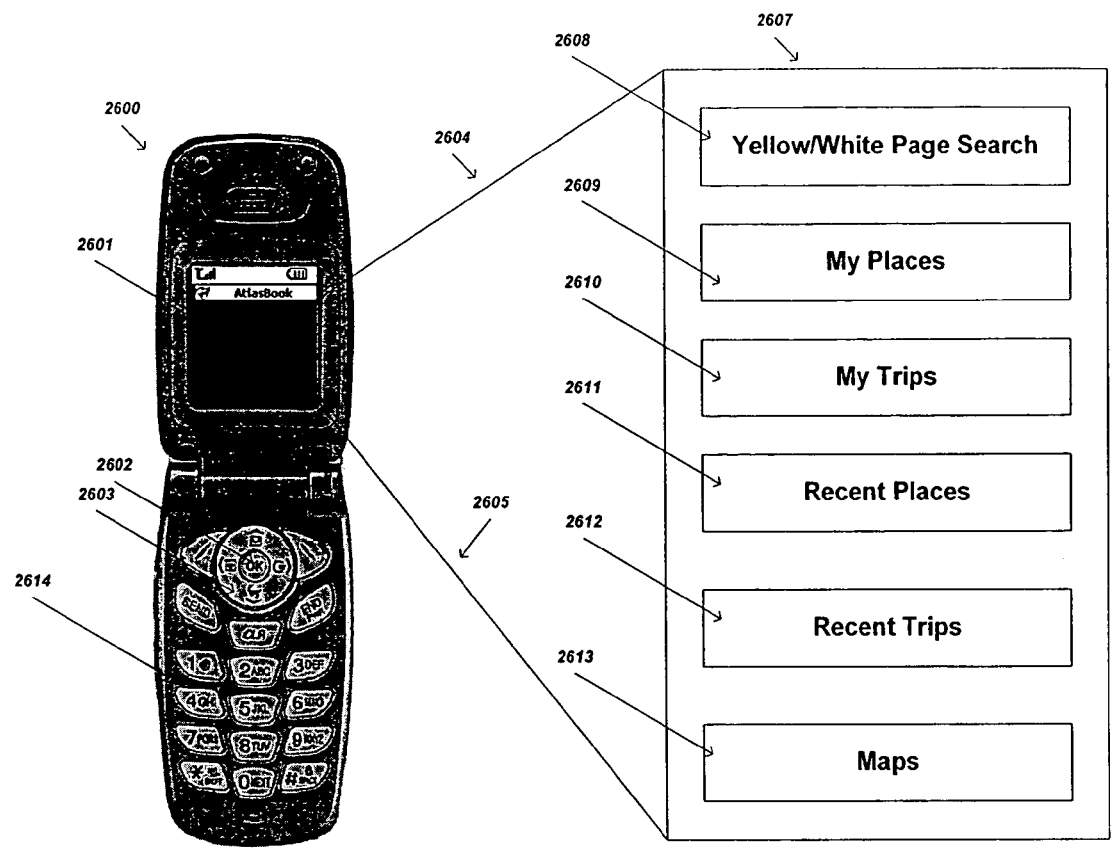
FIG. 26 illustrates one embodiment for displaying a menu on a Telecommunication Device for searching yellow pages information, retrieving user specific Place information, and recently viewed or saved Place and Trip information.

As people skilled in the art will appreciate, searching for Places and Trips (i.e., Directions or Routes) on a mobile wireless telephone is a daunting task, primarily due to the limited form factor of the wireless telephone (i.e., Telecommunication Device). As illustrated in FIG. 26 a wireless telephone 2600 is comprised of a display 2601 and a keypad 2614. As people skilled in the art understand, a user can maneuver around a wireless telephone's GUI 2601 using a rocker 2603 and a select button 2602 which simulates the functionality of a personal computer mouse. For this embodiment, as illustrated in FIG. 26, a GUI 2607 is shown displaying a menu of options that illustrates a graphical interface for searching for places (2609 & 2611) and trips (2610 & 2612) and for displaying maps 2613 on a wireless telephone. This GUI 2607 is illustrated by magnifying the projection (2604 & 2605) of the wireless phone's GUI 2607 in order to aid in the illustration of this invention.

Figure 27:
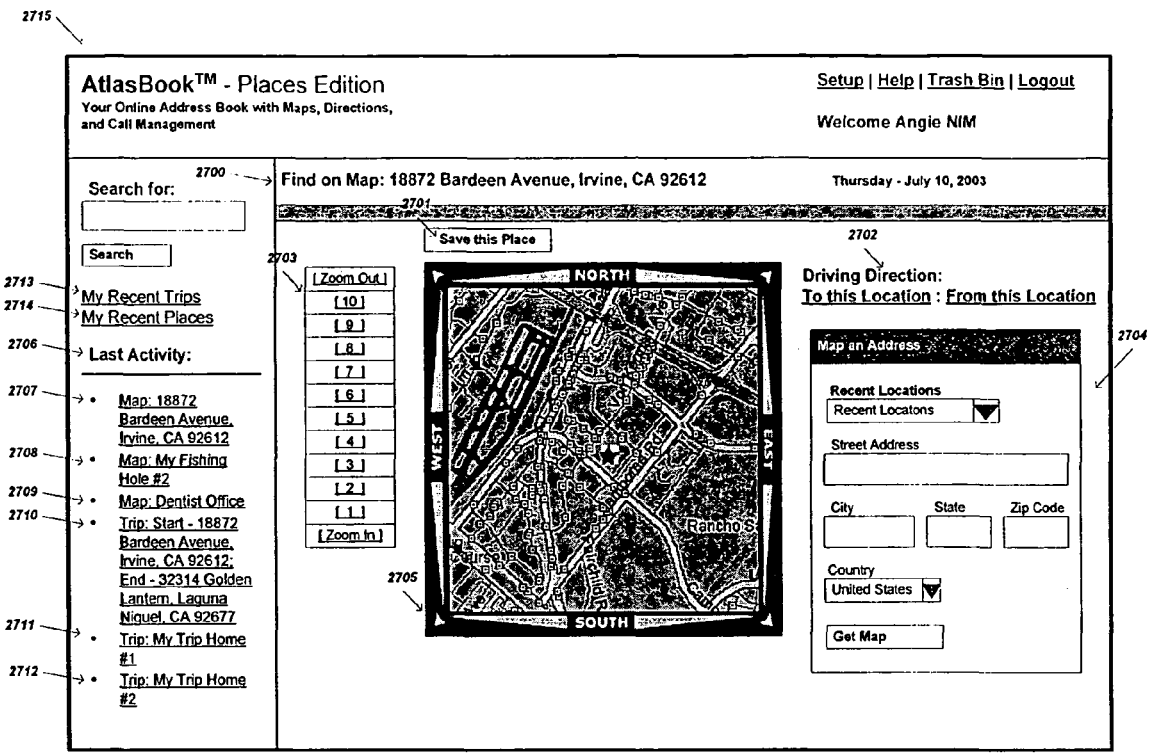
FIG. 27 illustrates one embodiment for displaying a Map of a Place on a web page.

In one embodiment, using a web browser it is possible to display a web page 2715 that illustrates the core functionality of finding a Place. A Place 2700 is typically defined as having a geographical location, such as an address which can further derive a Place's latitude and longitude coordinates. A Place 2700 that is derived from a realizable address can be shown on a Map 2705 of varying resolution and size. A Map typically allows a user to zoom in or out 2703 or to pan around the Map 2705. As illustrated in this invention, a Place 2700 does not have to be saved, as required by prior art systems. As people skilled in the art will appreciate, geographical locations (i.e., Places) that were found using the ASP system 123 are cached by the system and displayed to the user in the Last Activity 2706 portion of the web page 2715. This illustrates not only saved and cached (i.e., not purposely saved by the user) Places (2707 & 2708 & 2709), but also saved and cached Trips (2710 & 2711 & 2712). Saved Places and Trips are accessible using the "My Recent Places" 2714 and "My Recent Trips" 2713 links from this web page 2715. The "Last Activity" 2706 preferably embodies all activity (i.e., in reverse chronological order) initiated by the user on the web page 2715 and on one or more of their Telecommunication Devices or remote computing devices, and which was registered since the user was authenticated and recorded by the ASP system 123. For example, a user may have searched from the Place "My Fishing Hole #2" 2708 on their wireless telephone and then searched for the address "18872 Bardeen Avenue, Irvine, Calif. 92612" via the web page 2715. This search is illustrated in the "Last Activity" 2706 section of this web page. It should be appreciated by those skilled in the art that this "Last Activity" 2706 illustrates searches from multiple computing devices that had, at one time, a direct connection with the ASP system 123. It should also be appreciated by those skilled in the art that any geographical search (e.g., POI, Address, Latitude/Longitude Coordinates, etc.), can be saved as a Place 2701 or waypoint. Additionally, any geographical search can be used as a route destination point 2702 (i.e., Start, End, Via, or Stop point). FIG. 27 illustrates only a Start and End 2702 point, however this invention supports Via and Stop points as known to those that are skilled in the art. Additionally, a user can initiate a geographical search 2704 from this web page 2715 to find another Place 2700.

Figure 28A:
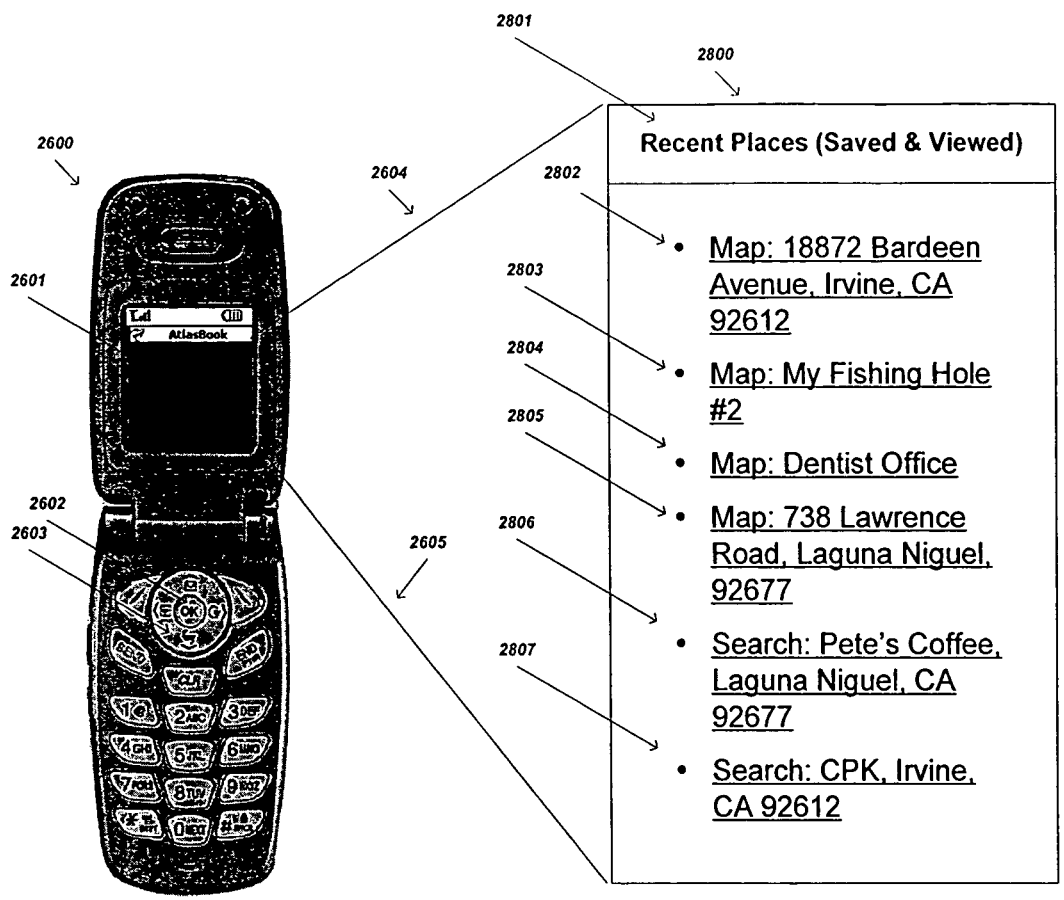
FIG. 28A illustrates one embodiment for displaying the recently viewed or saved Places on the Telecommunication Device that were retrieved either locally from the Telecommunication Device or remotely from an online server system.

Additionally, FIG. 28*a* illustrates a GUI display (2800 & 2601) of the "Recent Places" 2801 view on the wireless telephone 2600. It should be appreciated by those skilled in the art that this "Recent Places" 2801 view illustrates Places that were both saved and viewed or searched on the wireless telephone 2600 and on the web page 2715. As people skilled in the art will appreciate, this allows a user to plan on the web page 2715 and view the results on their wireless telephone without having to initiate the search on the wireless telephone's 2600 application. For example, in this embodiment the user had searched for a map of the address "18872 Bardeen Avenue, Irvine, Calif. 92612" using the wireless telephone 2600, but also searched previously on the web page 2715 for their stored Places (2803 & 2804 & 2806) and searched addresses 2805 and POI's (2806 & 2807) that were done while signed in to the web page 2715 that was accessing the ASP system 123.

Figure 28B:
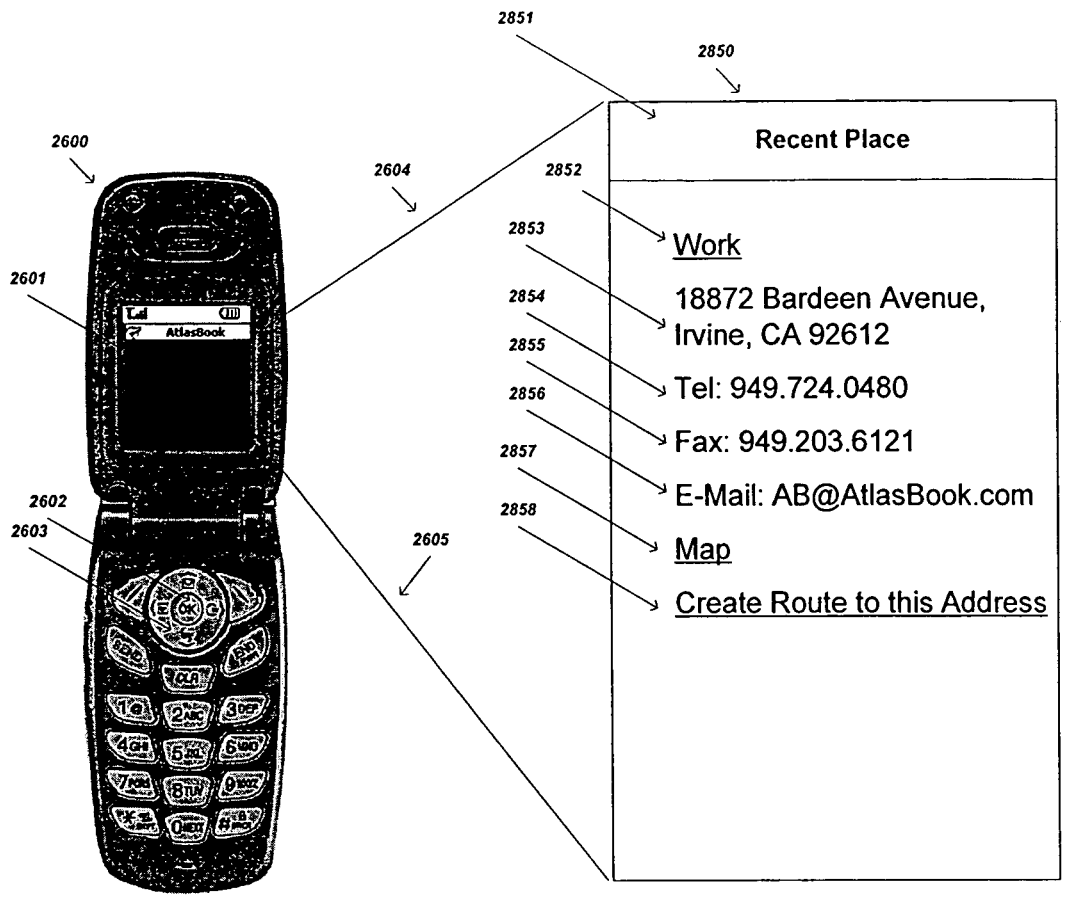
FIG. 28B illustrates one embodiment for displaying the detailed information for a Place that was retrieved either locally on the Telecommunication Device or remotely from an online server system.

Illustrated in FIG. 28*b*, after searching for a Place 2851 on the wireless telephone 2600 a user is able to display the Recent Place's 2850 detailed information. This information can consist of a business 2852 address 2853, telephone 2854, fax number 2855, e-mail address 2856 and a link to view a Map 2857 of this Place's location or create a route 2858 to the Place's address 2853. It should be appreciated by those skilled in the art that a route can be dynamically generated using the wireless telephone's 2600 GPS interface 307 to create a real-time route from the mobile position of the wireless telephone 2600.

Figure 17:
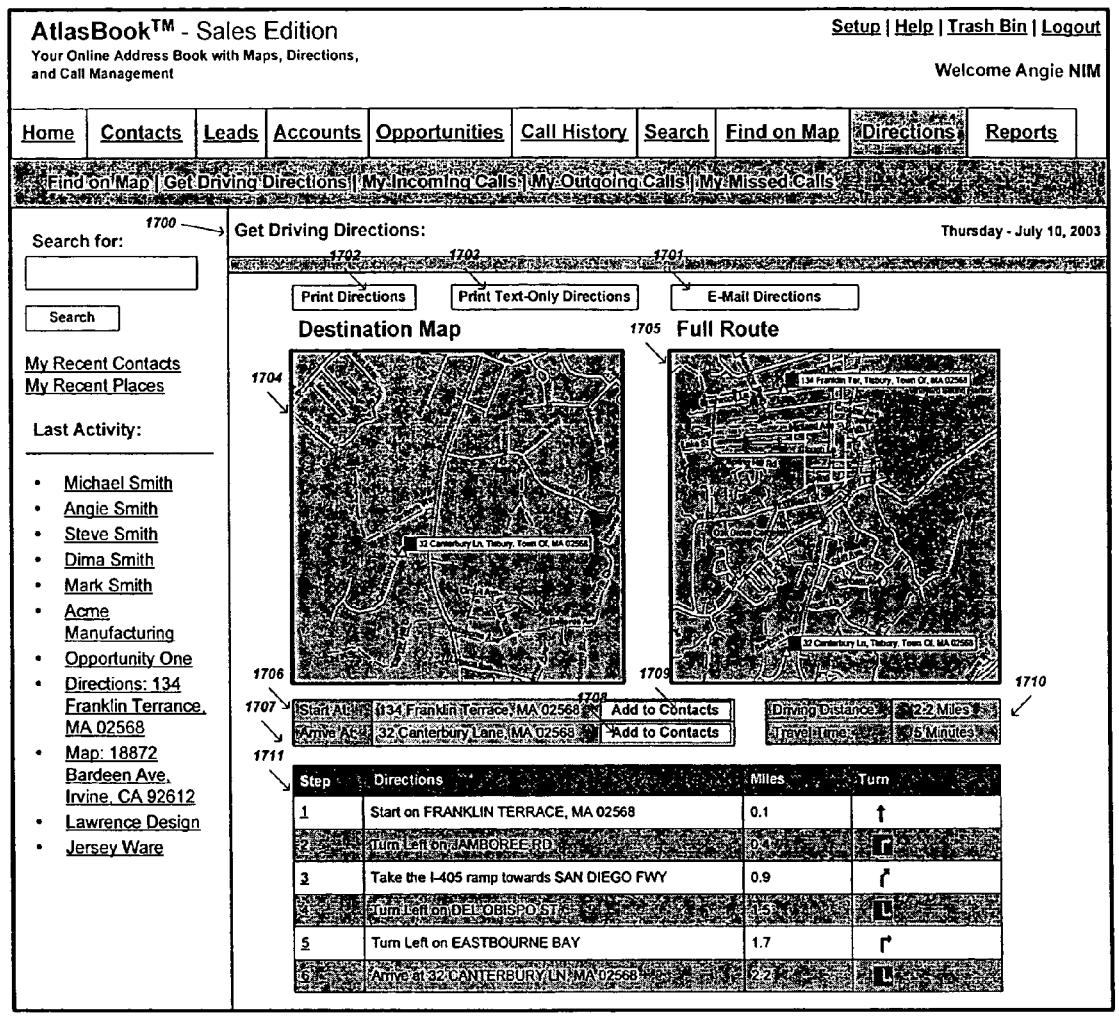
FIG. 17 illustrates one embodiment for displaying a map or a route, travel time, driving distance, and driving directions for a planned route.
Figure 29:
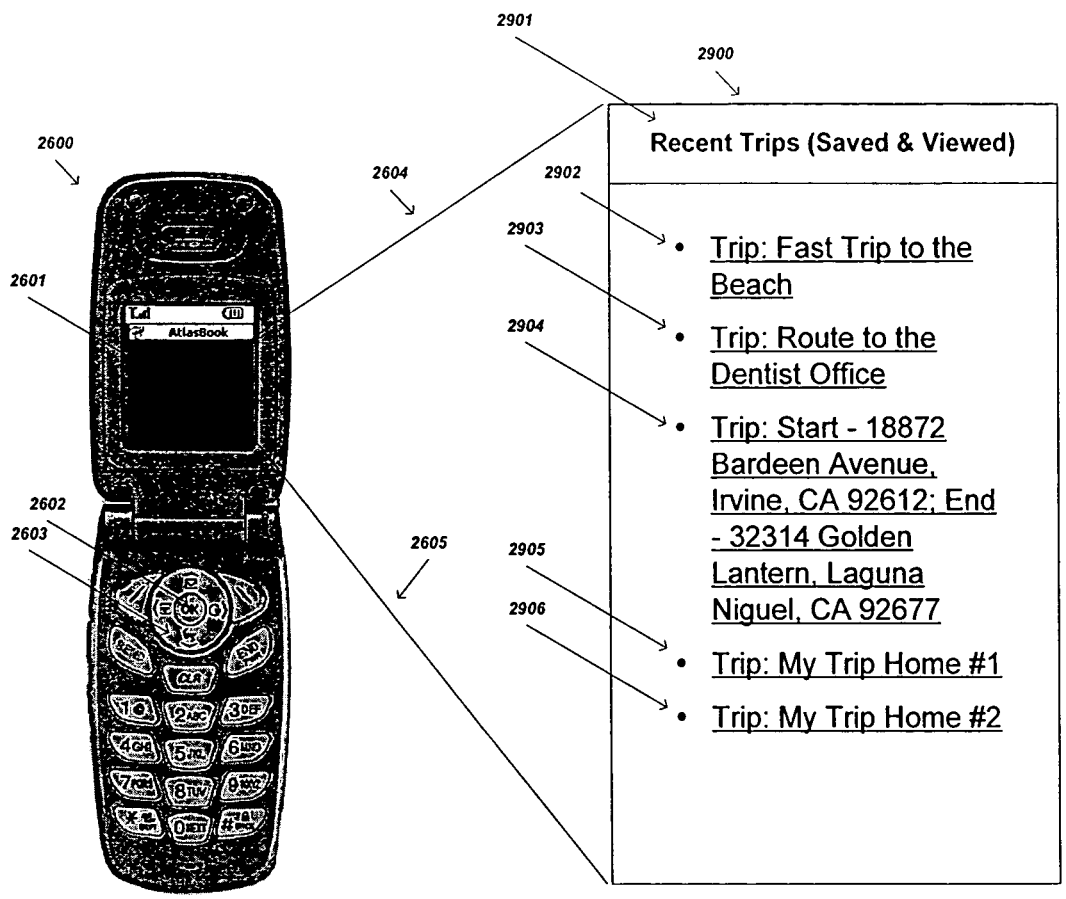
FIG. 29 illustrates one embodiment for displaying the recently viewed or saved Trips on the Telecommunication Device that were retrieved either locally from the Telecommunication Device or remotely from an online server system.

Similar to the "Recent Places" 2801 view, as illustrated in FIG. 29, is the "Recent Trips" 2901 view on the wireless telephone's 2600 GUI display (2900 & 2601). It should be appreciated by those skilled in the art that this "Recent Trips" 2901 view illustrates Trips that were both saved and viewed on the wireless telephone 2600 and on the web page 2715. As people skilled in the art will appreciate, this allows a user to plan on the web page 2715 and view the results on their wireless telephone without having to create a Trip on the wireless telephone's 2600 application. For example, in this embodiment the user had created a Trip starting from the address "18872 Bardeen Avenue, Irvine, Calif. 92612" to the destination address "32314 Golden Lantern, Laguna Niguel, Calif. 92677" on the web page 2715 as illustrated in FIG. 16 & FIG. 17. The wireless telephone 2600 displays and can retrieve both the created and cached Trips 2904, as well as the created and saved Trips (i.e., Trips that were named) (2902 & 2903 & 2905 & 2906) from either the ASP system 123 or the Trips that were created and/or stored on the wireless telephone 2600.

Figure 30:
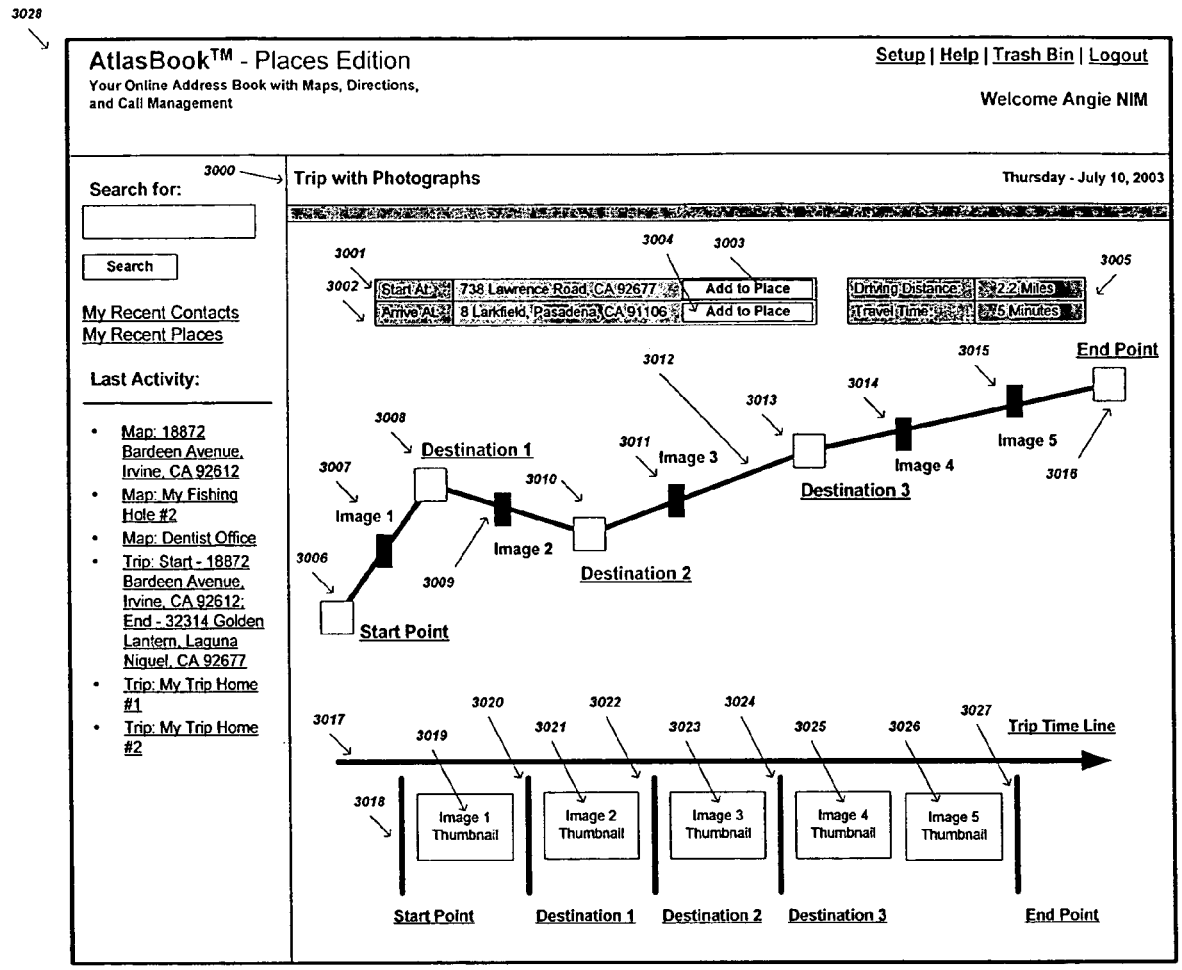
FIG. 30 illustrates one embodiment for displaying a representation of a Trip and the associated data that was acquired while using the Telecommunication Device on said Trip.

FIG. 30 depicts a Trip 3012 and Driving Directions 3000 which were calculated and displayed using a web page 3028 as known to those that are skilled in the art. As those that are skilled in the art will appreciate, FIG. 30 illustrates the method and system for creating a Trip 3012 with a plurality of destination points (3008 & 3010 & 3013) including a start point (3006 & 3001) and an end point (3016 & 3002). A Trip 3012 can be associated with a plurality of database records (3007 & 3009 & 3011 & 3014 & 3015) that were created and synchronized or transferred from the Telecommunication Device and were collected using the Telecommunication Device's specific interfaces, such as a camera interface 304 as illustrated in FIG. 3. For example, in one embodiment, a user plans a Trip 3012 on the web page 3028. The Trip has a travel time and driving distance 3005 as known to those skilled in the art. Additionally, the Trip has start 3001 and end 3002 points, which in this invention can be added to a user's saved Places using the "Add to Place" buttons for both the start 3003 and end 3004 points. After the user creates a route, they can journey along the route and take pictures or images using their wireless telephone's integrated camera 304. This allows a user to associate their Trip 3012 with the wireless telephone's camera. Each image (3007 & 3009 & 3011 & 3014 & 3015) that is recorded along the Trip 3012 has a time stamp and GPS coordinates that are associated with the image. Images with GPS coordinates are not required, but are the preferred embodiment for this invention.

After the images have been taken, they can be synchronized or transferred in real-time or in a batch process to the ASP system 123. One the user signs back into the web page 3028, they are able to review their entire trip and the photographs that they recorded during their Trip 3012 in the order that they took the pictures. As people that are skilled in the art will appreciate, the web page 3028 displays a timeline 3017 illustrating the chronological procession of the trip and the start 3018, destination (3020 & 3022 & 3024), and end point 3027 of the Trip 3012, in addition to the images that were taken along the Trip (3019 & 3021 & 3023 & 3025 & 3026) that map directly to the locations where the images were taken on the mapped route (3007 & 3009 & 3011 & 3014 & 3015). It should be appreciated by those skilled in the art that the Trip does not need to be created in advance, since a Trip is defined as having a Start and an End location, all of which can be calculated using a GPS device, which can determine when a device, such as a wireless telephone, has stopped moving for a defined period of time or the like. This type of GPS application that determines when a Telecommunication Device has stopped moving is currently available in the art. One embodiment of this type of application that determines when a wireless telephone has stopped moving is known as the "AtlasTrack" application owned and licensed by Networks In Motion, Inc. of Irvine, Calif. When a user signs into the web page 3028, the user is able to review their images in a Trip or Route format which was automatically created by the ASP system 123, and displayed to the user for their review. This allows a user to view their photographs both chronologically and spatially.

It should be noted that the present invention may be embodied in forms other than the preferred embodiments described above without departing from the spirit or essential characteristics thereof. The specification contained herein provides sufficient disclosure for one skilled in the art to implement the various embodiments of the present invention, including the preferred embodiment, which should be considered in all aspect as illustrative and not restrictive; all changes or alternatives that fall within the meaning and range or equivalency of the claim are intended to be embraced within.

What we claim:

1. A mobile communication device, comprising:
   a receiver for receiving an incoming phone call at a called mobile communication device;
   a location information receiver for receiving location information of said called mobile communication device receiving said incoming phone call;
   a trigger to:
      trigger recording of an association of said incoming phone call with said location information of said called mobile communication device into a call history log; and
      correlate a contact record to the incoming phone call based on a matching of a telephone number of the incoming call to a telephone number stored in the contact record;
   a map generator link, in said call history log, to generate a given link to a graphical illustration of a location of said called mobile communication device at a time said incoming phone call was made; and
   a contact link generator to generate another link to the contact record.

2. The mobile communication device according to claim 1, wherein said location information recorded into said call history log comprises:
   a position of said called mobile communication device, and at least one of a date and a time at which said calling mobile communication device placed said incoming phone call.

3. The mobile communication device according to claim 1, wherein said location information recorded into said call history log comprises:
   a position of said called mobile communication device, and an identification of said calling mobile communication device placing said incoming phone call.

4. The mobile communication device of claim 1, wherein the other link leads to editable contact information for an entity associated with the contact record.

5. The mobile communication device of claim 1, wherein the editable contact information includes an email address of the entity.

6. The mobile communication device of claim 1, wherein other link leads to editable account information for an account associated with the contact record.

7. A mobile communication device, comprising:
   a receiver for receiving an incoming phone call at a called mobile communication device;
   a location information receiver for detecting a location of said called mobile communication device receiving said incoming phone call;
   a trigger to:
      trigger recording of an association of said incoming phone call with said location information of said called mobile communication device into a call history log; and
      correlate a contact record to the incoming phone call based on a matching of a telephone number of the incoming call to a telephone number stored in the contact record;
   a map generator link, in said call history log, to generate a given link to a graphical illustration of a location of said called mobile communication device at a time said incoming phone call was received by said mobile communication device; and a contact link generator to generate another link to the contact record.

8. The mobile communication device according to claim 7, wherein said location information recorded into said call history log comprises:

a position of said called mobile communication device, and at least one of a date and a time at which said calling mobile communication device placed said incoming phone call.

9. The mobile communication device according to claim 7, wherein said location information recorded into said call history log comprises:

a position of said called mobile communication device, and an identification of said calling mobile communication device placing said incoming phone call.

10. The mobile communication device of claim 7, wherein the other link leads to editable contact information for an entity associated with the contact record.

11. The mobile communication device of claim 7, wherein the editable contact information includes an email address of the entity.

12. The mobile communication device of claim 7, wherein other link leads to editable account information for an account associated with the contact record.

13. A mobile communication device comprising:

a receiver for receiving an incoming phone call at a called mobile communication device;

a location information receiver to receive location information of the called mobile communication device receiving the incoming phone call;

a trigger to:

trigger recording of an association of the incoming phone call with the location information of the called mobile communication device; and correlate a contact record to the incoming phone call based on a partial matching of a telephone number of the incoming call to a telephone number stored in the contact record;

a map generator link to generate a given link to a graphical illustration of a location of the called mobile communication device at a time the incoming phone call was made; and a contact link generator to generate another link to the contact record.

* * * * *